US012484779B2

(12) United States Patent
Aarnio

(10) Patent No.: US 12,484,779 B2
(45) Date of Patent: Dec. 2, 2025

(54) WIRELESS PATIENT MONITOR

(71) Applicant: GE Precision Healthcare LLC, Wauwatosa, WI (US)

(72) Inventor: Lauri Tapio Aarnio, Uusimaa (FI)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 577 days.

(21) Appl. No.: 17/659,297

(22) Filed: Apr. 14, 2022

(65) Prior Publication Data

US 2023/0329555 A1 Oct. 19, 2023

(51) Int. Cl.
*A61B 5/00* (2006.01)
*A61B 5/0205* (2006.01)
*A61B 5/021* (2006.01)

(52) U.S. Cl.
CPC .......... *A61B 5/0022* (2013.01); *A61B 5/0205* (2013.01); *A61B 5/021* (2013.01); *A61B 5/7275* (2013.01); *A61B 5/746* (2013.01)

(58) Field of Classification Search
None
See application file for complete search history.

(56) References Cited

U.S. PATENT DOCUMENTS

| 8,850,293 | B2 | 9/2014 | Baker et al. | |
| 9,395,792 | B1* | 7/2016 | Kahn | H04W 4/80 |
| 10,044,847 | B2 | 8/2018 | Economy et al. | |
| 2014/0184471 | A1* | 7/2014 | Martynov | G06F 21/6209 |
| | | | | 345/1.2 |
| 2016/0021614 | A1* | 1/2016 | Liu | H04L 51/04 |
| | | | | 370/311 |
| 2017/0173262 | A1* | 6/2017 | Veltz | G16H 20/17 |
| 2017/0181679 | A1 | 6/2017 | Hayter | |
| 2018/0296112 | A1* | 10/2018 | Girouard | A61B 5/316 |

(Continued)

FOREIGN PATENT DOCUMENTS

CN 104660717 A * 5/2015

OTHER PUBLICATIONS

Shahzad, Aamir, et al. "Real-time cloud-based health tracking and monitoring system in designed boundary for cardiology patients." Journal of sensors 2018.1 (2018): 3202787. (Year: 2018).*

*Primary Examiner* — Lena Najarian
(74) *Attorney, Agent, or Firm* — McCoy Russell LLP

(57) ABSTRACT

Systems are provided for increasing an uptime of a battery-powered wireless patient monitor. In one example, a wireless patient monitor comprises a wireless transceiver configured to transmit and receive information; a battery configured to power the patient monitor; a memory storing one or more instructions; and one or more processors configured to execute the one or more instructions to receive physiological patient data generated by one or more sensors arranged on a patient; control the transceiver to transmit the physiological patient data to a cloud-based server over a network for processing the physiological patient data based on an algorithm; receive the processed physiological patient data from the cloud-based server; and in response to one or more criteria being met, terminate transmission of the physiological patient data from the wireless patient monitor to the cloud-based server, and process the physiological patient data at the wireless patient monitor based on the algorithm.

4 Claims, 10 Drawing Sheets

(56) References Cited

U.S. PATENT DOCUMENTS

| | | | |
|---|---|---|---|
| 2021/0037389 A1* | 2/2021 | Mbonye | H04W 12/06 |
| 2021/0186368 A1 | 6/2021 | Kawecki et al. | |
| 2021/0251574 A1 | 8/2021 | Halter et al. | |
| 2021/0361164 A1* | 11/2021 | Bogdan | A61B 5/746 |
| 2022/0054008 A1* | 2/2022 | Venkatraman | G16H 50/70 |
| 2023/0255485 A1* | 8/2023 | Laine | A61B 5/746 |
| | | | 600/301 |

* cited by examiner

WIRELESS PATIENT MONITOR

TECHNICAL FIELD

Embodiments of the subject matter disclosed herein relate to medical devices and, more particularly, to patient monitoring devices for monitoring patient physiology and health status, especially wireless monitoring devices and systems.

BACKGROUND

Monitoring physiological parameters of a patient is an important part of patient care, and physicians often desire to continuously monitor multiple physiological parameters of their patients. Well-known parameters of patient health include blood pressure, oxygen saturation (SpO2), and features of the electrocardiogram (ECG). Thus, patient monitoring often involves the use of several sensing devices to perform multiple physiological monitoring modalities, such as a pulse oximeter, a blood pressure monitor, a heart monitor, a temperature monitor, etc. Many patient monitoring devices offer multi-modality patient monitoring, where multiple different sensing devices for sensing different physiological parameters can be connected to a single patient monitor that is configured to collect, process, and/or display physiological information describing the patient's health condition.

The patient monitor may be connected to wireless network accessible in the hospital environment, such that the multiple different sensing devices may communicate with the patient monitor wirelessly. Additionally, a caregiver may monitor physiological patient data of the patient remotely by viewing data of the patient monitor via a remote viewing application (e.g., on a smart phone) as the patient or the caregiver move around a hospital environment. In some cases, physiological patient data received at the patient monitor may be analyzed at the patient monitor to determine a health status of the patient. Depending on the health status, an alarm or a notification may be generated and displayed on the screen of the wireless patient monitoring device.

However, processing the physiological patient data at the wireless patient monitoring device may involve computationally heavy calculations, which may increase a load on central processing module (CPU) of the wireless patient monitoring device. Because an uptime of a battery-powered device typically depends on CPU load, a high CPU load due to the computationally heavy calculations may decrease an amount of uptime of the wireless patient monitoring device as the battery loses power.

SUMMARY

The current disclosure at least partially addresses one or more of the above identified issues by a wireless patient monitor, comprising a wireless transceiver configured to transmit and receive information; a battery configured to power the patient monitor; a memory storing one or more instructions; and one or more processors configured to execute the one or more instructions to receive physiological patient data generated by one or more sensors arranged on a patient; control the transceiver to transmit the physiological patient data to a cloud-based server over a network for processing the physiological patient data based on an algorithm; receive the processed physiological patient data from the cloud-based server; and in response to one or more criteria being met, terminate transmission of the physiological patient data from the wireless patient monitor to the cloud-based server, and process the physiological patient data at the wireless patient monitor based on the algorithm. In various embodiments, the one or more criteria may include a loss of a network connection between the patient monitor and the cloud-based server, or an activation of a display of the patient monitor. Because processing the physiological patient data may be computationally heavy, by transferring the processing of the physiological patient data to the cloud-based server when the patient monitor is connected to a wireless network and not being viewed by a caregiver, an amount of time that the patient monitor may be operated without being recharged may be increased. Additionally, because processing the physiological patient data may increase a temperature of the patient monitor, an amount of heat generated at the patient monitor may be reduced, thereby increasing a level of comfort of a patient.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

The following description relates to various embodiments for a wireless patient monitoring system. Patient monitoring may include a number of different physiological monitoring devices, sensors, etc. capable of monitoring cardiac, respiratory, neurologic, hemodynamic, pulse oximetry, etc. parameters such as but not limited to electrocardiography (ECG), peripheral capillary oxygen saturation (SpO2), respiration rate, temperature, blood pressures, entropy, blood glucose, and carbon dioxide. Patient monitoring is performed by way of many different forms and approaches with respect to data capture and communication technologies (e.g., hard-wired and wireless networking) and may include monitoring a patient locally (e.g., in-room wired or tethered to a monitor) and/or wirelessly (e.g., in-room, while in transport, ambulating telemetry). In addition to moveable roll stand and room-based semi-fixed or permanently mounted physiological patient data acquisition equipment acquiring one or more parameters, monitoring may be performed with small, portable devices (whether as multiple separate sensors or as an integrated acquisition device) coupled to the patient in order to enable the patient to ambulate (e.g., walk) remotely relative to a designated hospital bed or treatment room while maintaining monitoring of the condition of the patient (e.g., heart rhythm, oxygenation, and other patient vital signs). For example, ambulation of the patient may be desirable for resolution of various medical conditions for which the patient is being treated (e.g., chest pain, syncope, post-surgical). A care provider (e.g., nurse, doctor, or another clinician) may view an output of the monitoring device(s) on the device's user interface, at a remote location such as a patient monitoring central station, via another method such as an Electronic Medical Record (EMR) system, or at a handheld device throughout the duration that the monitoring device(s) is attached or coupled to the patient.

The patient monitor may be connected to a wireless network. The wireless network may further include a patient information database and/or other devices by which medical professionals may access and monitor patient data. Patient monitoring may include receiving physiological patient data from one or more sensors placed on the patient and displaying the physiological patient data on a patient monitor, and/or uploading the physiological patient data to hospital information systems via a wireless network. Once the physiological patient data has been uploaded to the hospital information systems, the physiological patient data may be transmitted to other devices such as a caregiver device for remote viewing.

Figure 1A:
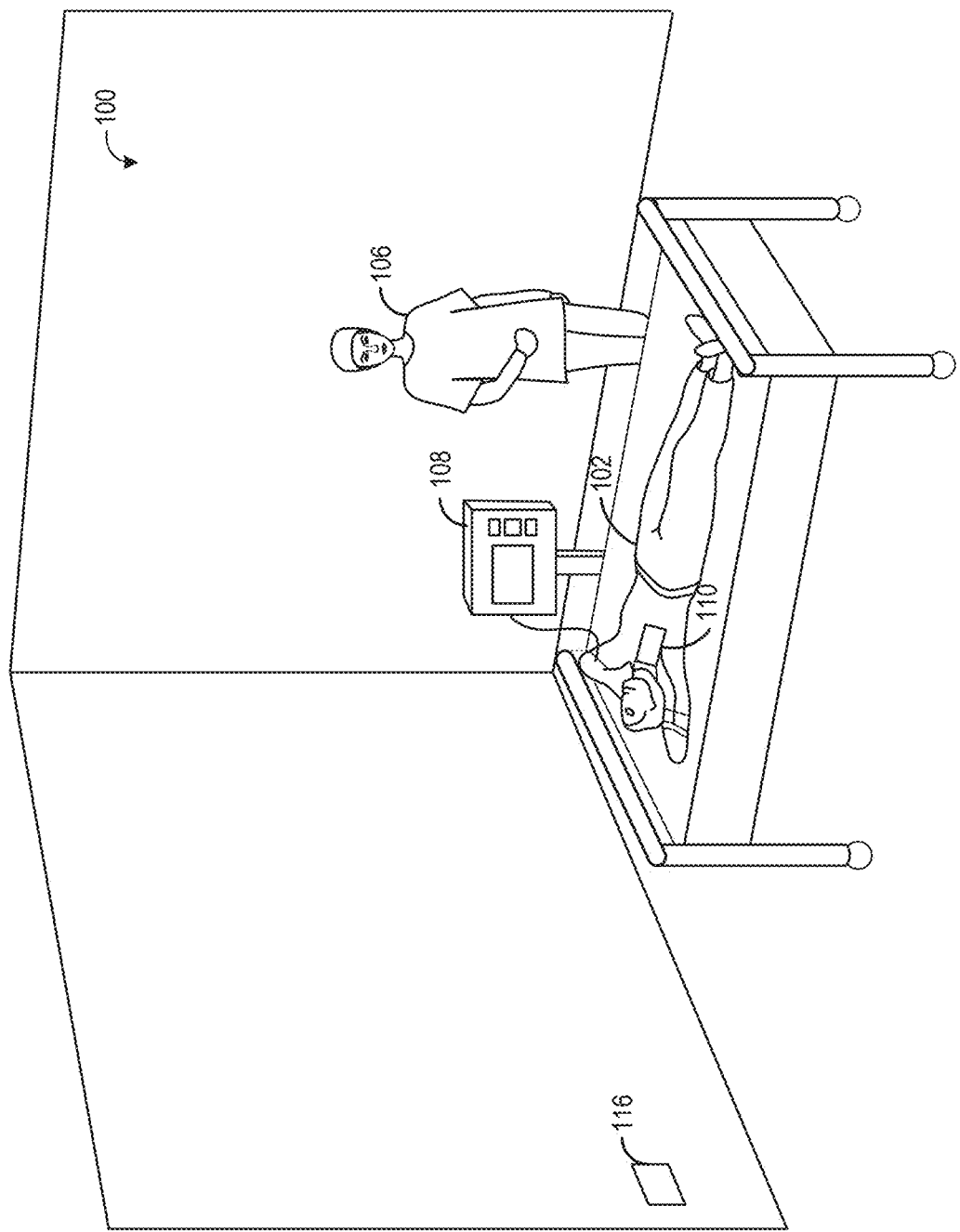
FIG. 1A schematically illustrates an example patient monitoring environment.
Figure 1B:
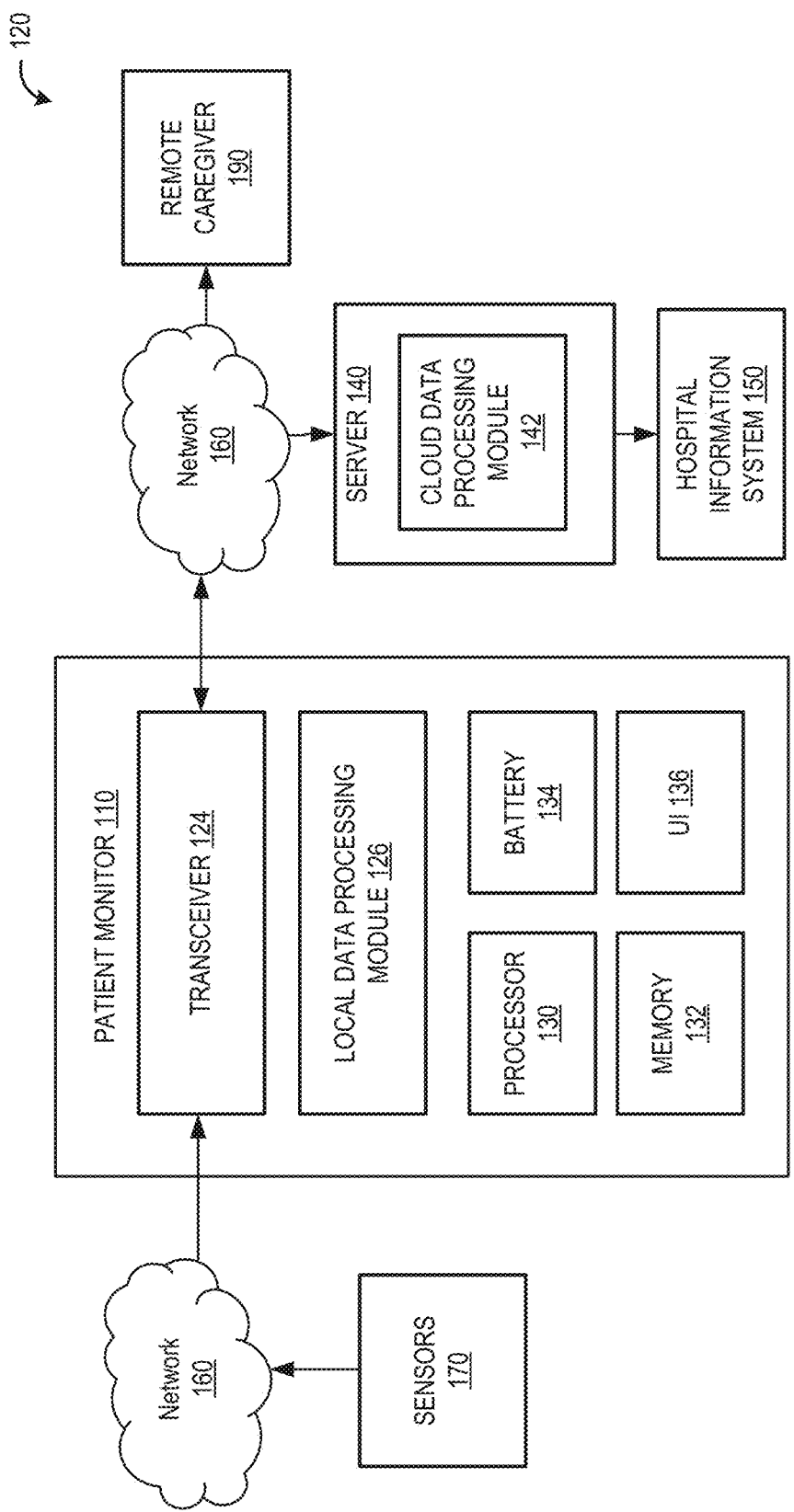
FIG. 1B is a schematic block diagram of a wireless patient monitoring system including a patient monitor, in accordance with one or more embodiments of the present disclosure.
Figure 2A:
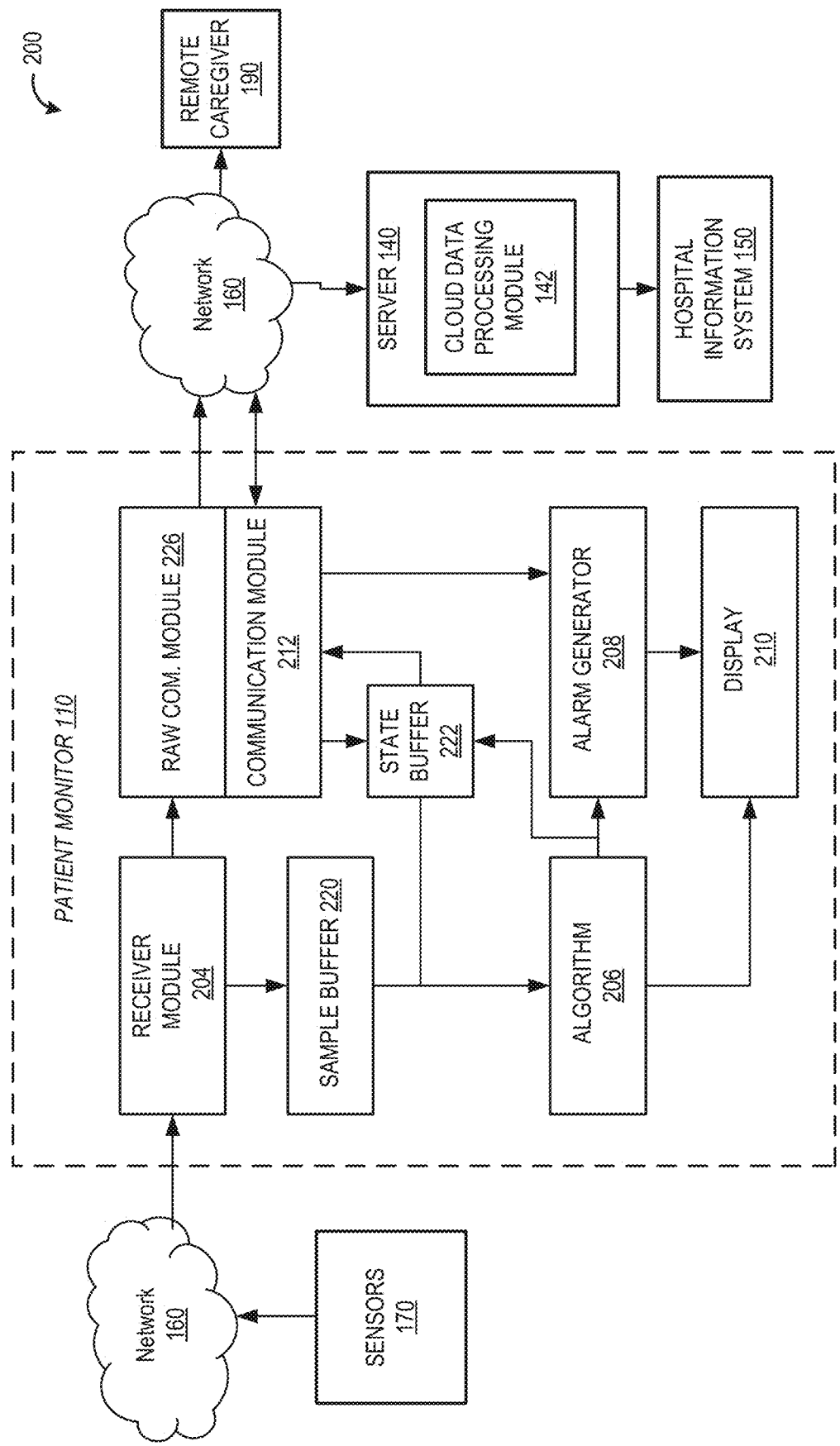
FIG. 2A is a data flow diagram illustrating a flow of data through elements of a wireless patient monitoring system, in accordance with one or more embodiments of the present disclosure.
Figure 2B:
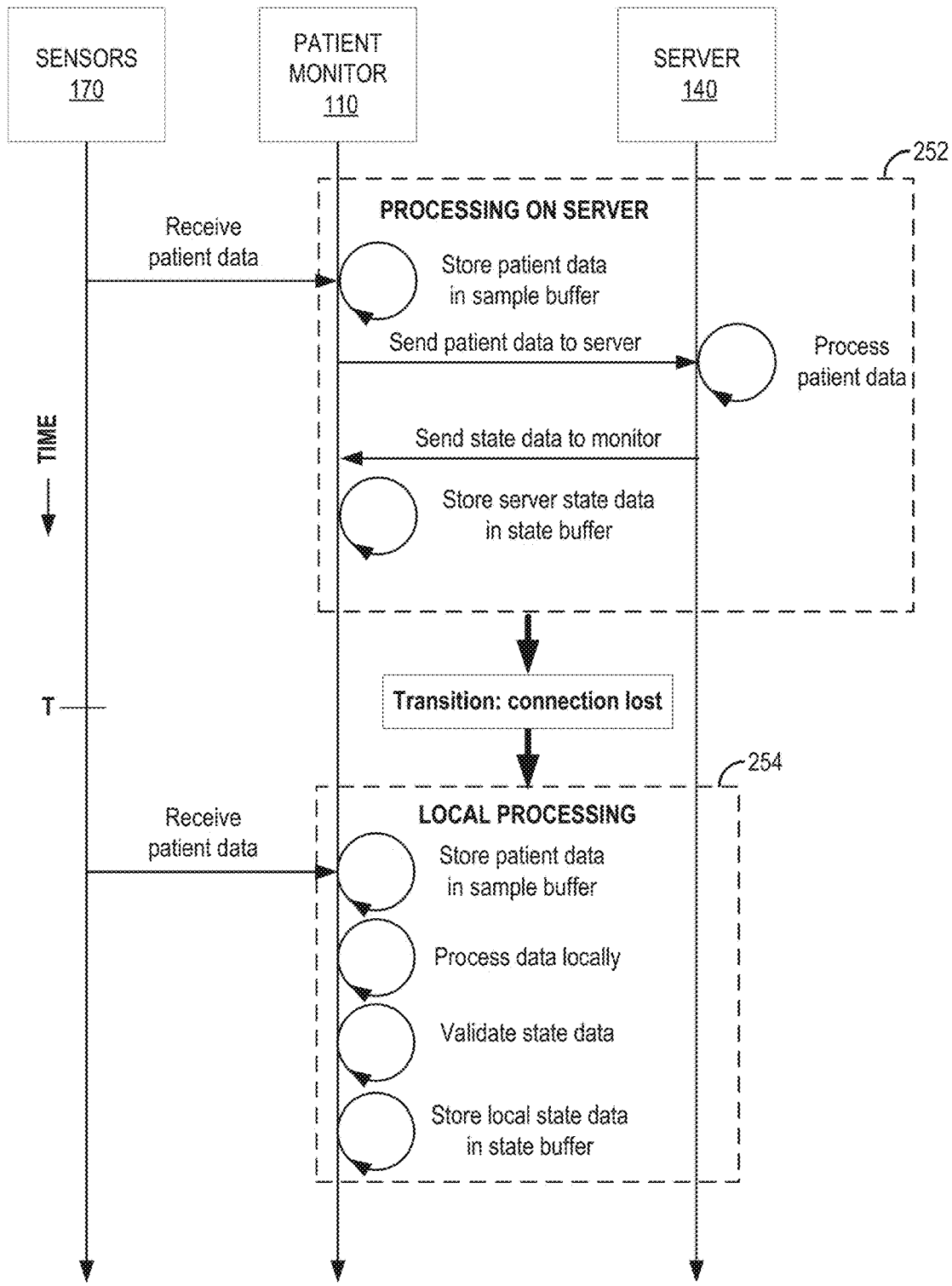
FIG. 2B shows a first data communication flow diagram illustrating a transition from processing physiological patient data at a server to processing the physiological patient data at the patient monitor, in accordance with one or more embodiments of the present disclosure.
Figure 2C:
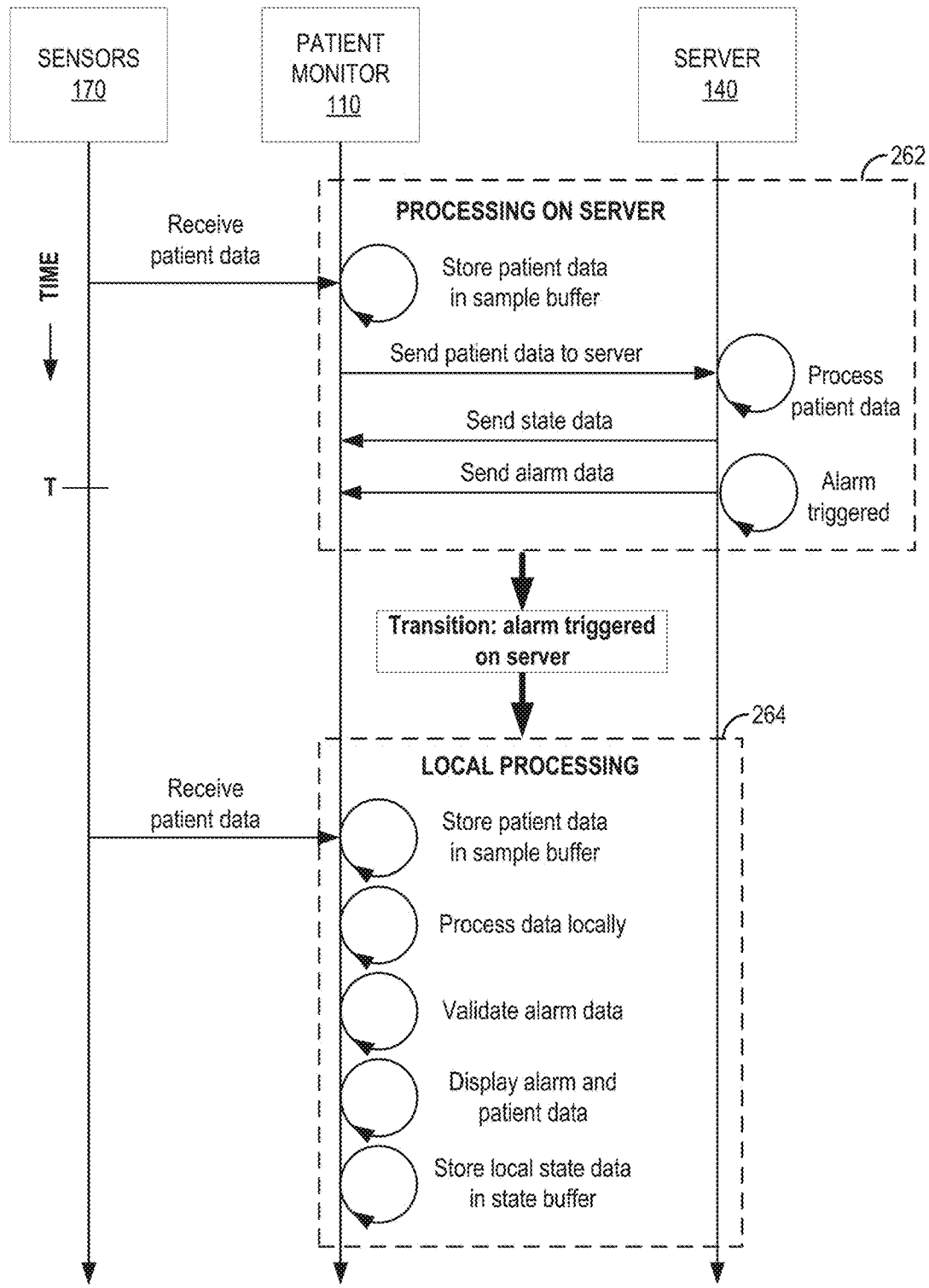
FIG. 2C shows a second data communication flow diagram illustrating a transition from processing physiological patient data at a server to processing the physiological patient data at a patient monitor, in accordance with one or more embodiments of the present disclosure.
Figure 2D:
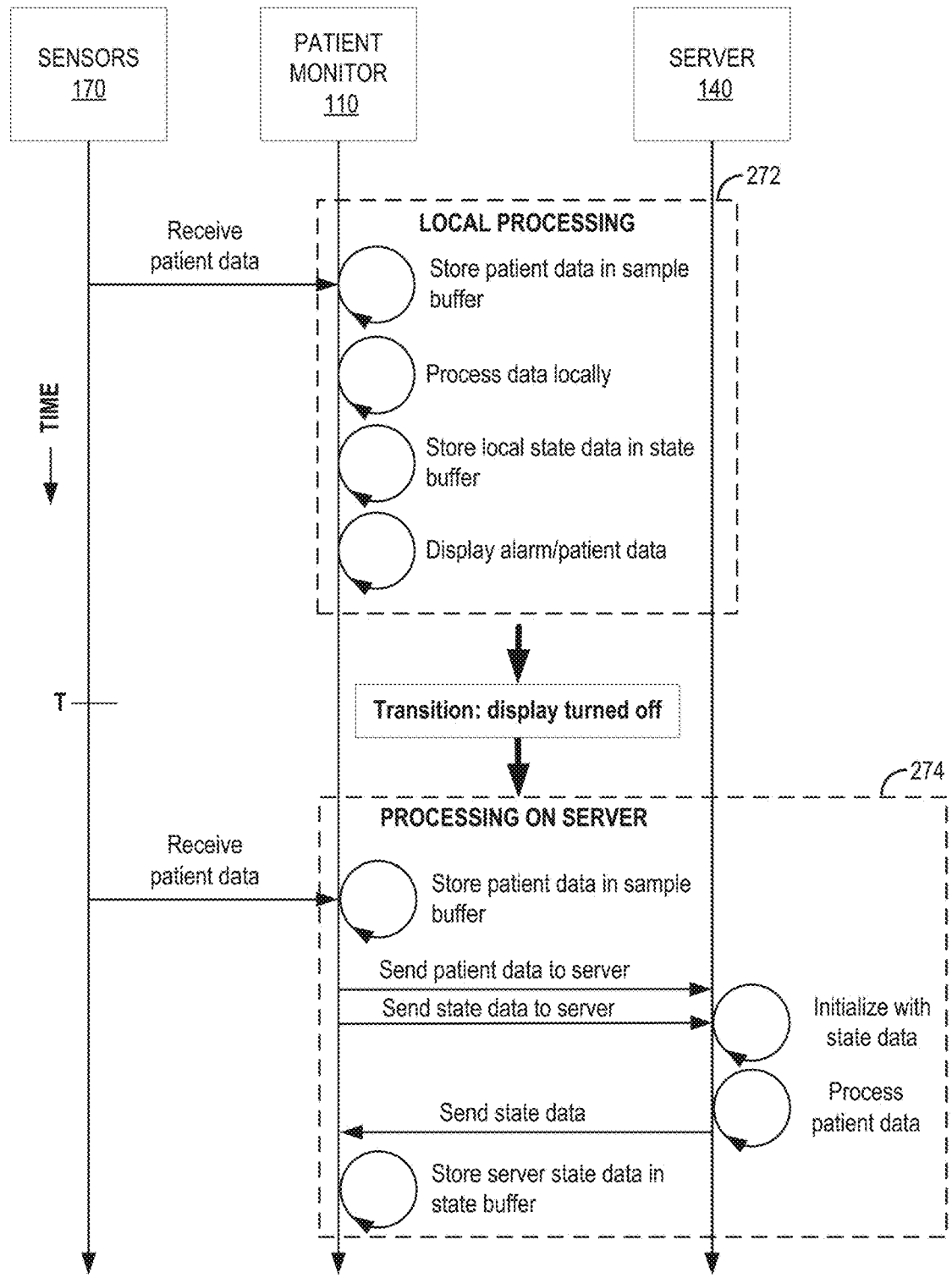
FIG. 2D shows a third data communication flow diagram illustrating a transition from processing physiological patient data at a patient monitor to processing the physiological patient data at a server, in accordance with one or more embodiments of the present disclosure.

An example patient monitoring environment is shown in FIG. 1A. FIG. 1B shows a wireless patient monitoring system including a wireless patient monitor, which may monitor a health status of a patient as the patient moves around a hospital environment. Additionally, a caregiver may remotely consult the wireless patient monitoring system via a remote monitoring application when the caregiver is not physically near the patient. The wireless patient monitor may receive physiological patient data transmitted wirelessly from one or more sensors arranged on a body of the patient, and display health status information and/or the physiological patient data on a screen of the patient monitor. A flow of the physiological patient data and the health status information from the one or more sensors to the screen is illustrated in FIG. 2A, where the physiological patient data is transmitted from the patient monitor to a data processing module of a cloud-based server that generates the health status information, and the health status information is transmitted back to the patient monitor for display on the screen. FIG. 2B shows a first data communication flow diagram illustrating a transition from a first state where the physiological patient data is processed at the cloud-based server to a second state where the physiological patient data is processed at the patient monitor, due to losing a wireless connection. FIG. 2C shows a second data communication flow diagram illustrating a transition from a first state where the physiological patient data is processed at the cloud-based server to a second state where the physiological patient data is processed at the patient monitor, due to an alarm being triggered on the cloud-based server. FIG. 2D shows a third data communication flow diagram illustrating a transition from a first state where the physiological patient data is processed at the patient monitor to a second state where the physiological patient data is processed at the cloud-based server, due to a display of the patient monitor being turned off. A method such as the method described in FIG. 3 may be used to determine whether to process the physiological patient data locally at the patient monitor or remotely at the cloud-based server. The physiological patient data may be processed locally by carrying out one or more steps of the method described in FIG. 4, or processed remotely at the cloud-based server by carrying out one or more steps of the method described in FIG. 5. An exemplary user interface (UI) of the patient monitor is shown in FIG. 6, where an indication is provided to a user of where the physiological patient data was processed.

FIG. 1A shows an example patient monitoring environment 100, which in the depicted example is a patient room in a hospital or other medical facility. The patient monitoring environment 100 may include one or more patient monitoring devices, monitoring one or more physiological parameters. The monitoring environment 100 includes a patient 102 being monitored by a plurality of monitoring devices and also being attended to by a clinician 106. Clinician 106 may be a nurse, physician, medical technologist, or another suitable medical professional. The monitoring devices include a bedside device 108 and a patient monitor 110. The monitoring environment 100 depicts the use of more than one monitoring device but it is understood this is non-limiting as the environment 100 could include one device monitoring one parameter, one device monitoring more than one parameter, multiple devices each monitoring one or more than one parameter, and so on. Due to differing patient conditions and the varying patient monitoring needs, one or more devices may be used to support the monitoring needs of the patient and capable of supporting monitoring in various conditions (e.g., in room, in transport, patient ambulation). The one or more bedside devices 108 may be included or mounted in a floor, table top, or roll stand module that includes one or more leads or other components coupled to the patient or in wireless communication to a device connected to the patient, in order to monitor one or more parameters of the patient (such as ECG, respiration, blood pressure, carbon dioxide levels, etc.). The one or more bedside devices 108 are configured to remain in the patient room, and thus patient 102 may have limited mobility when coupled to the one or more bedside devices 108.

Patient monitor 110 may include one or more telemetry devices (with different sensor capabilities) housed in a common module (as shown) or housed in two or more separate modules. Patient monitor 110 may be positioned on the patient (e.g., via a pouch, holder, or similar, attached to a belt of the patient) or on a movable module (e.g., a wheeled module), such that patient monitor 110 may leave the patient room if the patient leaves the patient room, and may travel with the patient. Patient monitor 110 may be connected to the patient 102 via one or more leads or other components or in wireless communication with an associated sensor, in order to monitor one or more parameters of the patient (such as ECG, respiration, blood oxygen level, etc.).

The patient monitoring data collected by patient monitor 110 may be sent wirelessly (e.g., WiFi, Bluetooth, MBAN) and/or via a hard-wired networked connection to one or more associated devices for processing, analysis, storage, display, etc., such as a central station, patient monitoring database, and/or different patient monitoring system. The methods of wireless communication used by patient monitor 110 and the receiving systems vary widely based on the technology used. In one example communication approach, to facilitate the transfer of the patient monitoring data collected by patient monitor 110, patient monitoring environment 100 and nearby areas (e.g., hallways, closets, open spaces) may include one or more access points 116. Access point 116 may receive and send information (e.g., wirelessly) to patient monitor 110 (e.g., the patient monitoring data, communication status). The access point 116 sends the received information to a processing server, a central station, a telemetry monitoring system, and/or another suitable device. If patient 102 leaves the patient room and moves throughout the medical facility, patient monitoring data collected by patient monitor 110 may be sent to other access points located throughout the medical facility. Patient monitoring data collected by the one or more bedside devices 108 may likewise be sent to a processing and analysis server, the central station, the telemetry monitoring system, and/or another suitable device, via wireless communication with access point 116 or another access point, or via a wired connection. It is understood, this example using a transceiver and access point for data communications is one of many different technologies suitable for sharing acquired patient monitoring data with the associated data processing, analysis, storage, and information viewing system components and infrastructure.

Referring now to FIG. 1B, a patient monitoring system 120 is shown that includes patient monitor 110 of FIG. 1A, which may be connected to one or more sensors 170, and a server 140, where patient data may be transmitted from the one or more sensors 170 to patient monitor 110 over a network 160. Patient monitor 110 may also send data to server 140, and receive data transmitted from server 140 over the network 160. In various embodiments, the patient monitoring system 120 may be established within a hospital environment or healthcare facility, such as within a patient monitoring environment such as patient monitoring environment 100 of FIG. 1A.

In various embodiments, the one or more sensors 170 may be arranged on a patient at a location where the patient is receiving treatment, as described above in reference to FIG. 1A. For example, the one or more sensors 170 and patient monitor 110 may be located within the healthcare facility, where the one or more sensors 170 are arranged on the patient at a bed of the hospital facility, and patient monitor 110 may be located at the bed of the patient. In some embodiments, a clinician may view the patient data on patient monitor 110 remotely in an office, research module, laboratory, or while moving around the hospital facility.

The one or more sensors 170 may be specially designed devices for sensing a certain type or types of patient data via placement on a patient's body, and communicating the patient data to patient monitor 110. The one or more sensors 170 may further include a plurality of sensors of different types or the same type. The one or more sensors 170 may include sensors for obtaining physiological patient data from a patient. For example, the one or more sensors may include, but are not limited to, a 3-lead ECG sensor, a pulse oximetry sensor, a blood pressure sensor, a digital stethoscope, a respiratory sensor, a temperature sensor, and the like. The one or more sensors 170 may include a combination of one or more different kinds of sensor.

The physiological patient data is alternatively referred to herein as patient data. The patient data may include, for example, vital signs of the patient, such as a blood pressure or a pulse, and/or any other type of data that may be acquired from a sensor capable of acquiring patient physiological patient data in real-time. Thus, the data sensed by the one or more sensors 170 correlates to the type of sensors in one or more sensors 170 and may include ECG data, PPG data, blood pressure data, SpO2 data, respiratory rate, otoscope data, temperature data, and the like. It will be appreciated that the types of sensors listed above are mentioned for illustrative purposes, and the one or more sensors 170 may additionally include other types of sensors for obtaining physiological patient data of a patient without departing from the scope of this disclosure.

The patient data from the one or more sensors 170 may be acquired concurrently or selectively from one or more selected subsets of sensors of the one or more sensors 170. Said another way, while the one or more sensors 170 are present, a user (e.g., a caregiver) may select, via either or both of patient monitor 110 or the one or more sensors 170, one or more subsets of sensors from which corresponding data may be selectively acquired. In some embodiments, different types of patient data may be acquired concurrently or selectively independent of each other. For example, patient monitor 110 may acquire auscultation data (e.g., via a digital stethoscope) but no ECG data, or ECG data but no auscultation data. In other words, while audio and ECG sensors may both be present, auscultation or ECG data may be selectively obtained.

The one or more sensors 170 may communicate the acquired patient data wirelessly to patient monitor 110 over the network 160, which may include in a non-limiting manner, a wide area network (WAN); a local area network (LAN); the Internet; a wired or wireless (e.g. optical, Bluetooth, Bluetooth Low Energy (BLE), radio frequency (RF) network; a cloud-based computer infrastructure of computers, routers, servers, gateways, etc.; or any combination thereof associated therewith that allows one or more computing devices within the patient monitoring system 120 to connect with each other. The network 160 may be or include a public network, or a private network associated with a portion of a care facility, for example a surgery module or department of a hospital, or may be more broadly located across medical devices of an entire hospital or hospital system. In some embodiments, patient monitor 110 and the one or more sensors 170 may be communicatively coupled via a wireless personal area network (PAN) technology such as a Medical Body Area Network (MBAN). In other embodiments, any PAN technology may be used, such as induction wireless, infrared wireless, ultra wideband (UWB), Bluetooth®, or any other similar technology for wireless communication between co-located devices. For example, the one or more sensors 170 may communicate with patient monitor 110 via an MBAN network of network 160, and patient monitor 110 may communicate with other elements of patient monitoring system 120 via a WiFi network.

Patient monitor 110 may include a transceiver 124, a local data processing module 126, a processor 130, a memory 132, a battery 134, and a user interface (UI) 110. Patient monitor 110 may be adapted to receive data over the network 160 via the transceiver 124. In some embodiments, the transceiver 124 may be or may include a WLAN wireless card. In some embodiments, the WLAN card may be an original equipment manufacturer (OEM) card, and may include a storage medium having computer executable code and a processor to execute that code, thus effectuating the operation of the WLAN card. Patient monitor 110 may use the transceiver 124 to connect to the network 160. For example, the transceiver 124 may connect to the network via an access point of the network (e.g., access point 116 of FIG. 1A) arranged at a location of the hospital environment, for example, in proximity to patients being monitored at a care module. The network may receive wirelessly transmitted information from the access point, and relay the information to one or more connected devices and/or a hospital information system suitable for collecting and managing such information.

Patient monitor 110 may include a processor 130. The processor 130 may control the operation of patient monitor 110 in response to control signals from the UI 136. In some embodiments, the UI 136 may be integrated into patient monitor 110, where a user may interact with, adjust, or select control elements in the UI 136 (e.g., buttons, knobs, touchscreen elements, etc.) to send one or more control signals to the processor 130 from the UI 136. In other embodiments, the UI 136 is not integrated into patient monitor 110, and the user may interact with, adjust, or select control elements in UI 136 via a user input device, such as a mouse, track ball, touchpad, etc., or the operator may interact with UI 136 via a separate touchscreen, where the operator touches a display screen of UI 136 to interact with UI 136, or via another type of input device.

The UI 136 may include a display (e.g., screen or monitor) and/or other subsystems. Patient monitor 110 may be in the form of a laptop computing device, a tablet, a smart phone, or any other device configured to transmit data over a network. For example, a patient receiving remote care from their home may use an iPhone or iPad as patient monitor 110.

The processor 130 may execute instructions stored on a memory 132 to control patient monitor 110. As discussed herein, the memory 132 may include any non-transitory computer readable medium in which programming instructions are stored. For the purposes of this disclosure, the term "tangible computer readable medium" is expressly defined to include any type of computer readable storage. The example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device. In various embodiments, the memory 132 may include an SD memory card, an internal and/or external hard disk, USB memory device, or similar modular memory.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Upon being received at patient monitor 110, the patient data may be processed by local data processing module 126. Processing the patient data may include, for example, comparing values of the patient data with one or more threshold values stored in the memory 132. For example, patient monitor 110 may include one or more lookup tables stored in the memory 132 with the one or more threshold values. During processing of the patient data, a threshold value of the one or more threshold values may be retrieved from the one or more lookup tables and compared to a corresponding value of the patient data. For example, if a blood pressure of the patient exceeds a threshold blood pressure (e.g., retrieved from the one or more lookup tables), a health status alert may be generated. In response to the health status alert being generated, an alarm may be generated, to be displayed to a caregiver at a display of the UI 136. Processing of the patient data is described in greater detail below in reference to FIGS. 2A-5.

In some embodiments, the patient data and/or results of any processing of the patient data (e.g., health status information) may be transmitted over the network 160 to one or more hospital information systems 150 of the patient monitoring system 120, via server 140. Server 140 may also serve the patient data and/or results to a wireless device of a remote caregiver 190, so that the remote caregiver 190 may view the patient data and/or results. Further, some or all of the processing of the patient data may be carried out at server 140. For example, under some conditions, the patient data received at patient monitor 110 from the one or more sensors 170 may be transmitted to server 140 over the network 160 without being processed at local data processing module 126, and the patient data may be processed at a cloud data processing module 142 of server 140. Processing the patient data at cloud data processing module 142 is described in greater detail below in reference to FIG. 5.

Referring now to FIG. 2A, a data flow diagram 200 illustrates a flow of data through patient monitor 110 of the wireless patient monitoring system 120 of FIG. 1B. In particular, data flow diagram 200 illustrates the flow of data through various modules, components, and/or code blocks of local data processing module 126 of patient monitor 110 as the patient data is processed. As described in greater detail below, the processing of the patient data may include determining a health status of the patient, and further determining whether to generate an alarm based on the health status.

The flow of data may originate with an acquisition of the patient data at the one or more sensors 170. Upon acquisition, the patient data may be transmitted to patient monitor 110 via the network 160. In some embodiments, the patient data may be processed by the one or more sensors 170 prior to transmitting the patient data to patient monitor 110. For example, the patient data may be compressed by resampling the patient data at a lower sampling frequency. The patient data may also be encrypted to protect a privacy of the patient data, filtered, encoded, and/or otherwise processed by the one or more sensors 170.

Correspondingly, when the patient data is received by a transceiver of patient monitor 110 (e.g., transceiver 124 of FIG. 1B) the patient data may be processed at a receiver module 204 of patient monitor 110, prior to being analyzed and processed more thoroughly at a local data processing module (e.g., local data processing module 126 of FIG. 1B). For example, the processing performed by the receiver module 204 may include decrypting the patient data. Additionally, during transmission of the patient data from the one or more sensors 170 over the network 160, some of the patient data may be lost or corrupted, whereby the initial processing performed by the receiver module 204 may include interpolating and/or extrapolating values of the patient data.

Once the patient data has been received and initially processed at the receiver module 204, patient monitor 110 may determine where further, more in-depth processing of the patient data may be performed. Patient monitor 110 may be configured to either process the patient data at patient monitor 110, or to transmit the patient data over network 160 to cloud data processing module 142 of server 140 for remote processing. By processing the patient data partially or fully at server 140 and not at patient monitor 110, an amount of energy consumed by patient monitor 110 may be reduced, thereby preserving a charge of a battery of patient monitor 110 (e.g., the battery 134) and increasing a duration during which patient monitor 110 may be used without having to be recharged. Alternatively, by processing the patient data partially or fully at patient monitor 110 and not at server 140, an amount of time taken to process the patient data (including transmission time) may be reduced, whereby the patient data may be displayed and updated more quickly on a screen of patient monitor 110. Thus, under some conditions it may be advantageous to process the patient data at patient monitor 110, while under other conditions it may be advantageous to process the patient data at cloud data processing module 142 of server 140.

For example, in a first condition, patient monitor 110 may process the patient data locally at patient monitor 110, and in a second condition, the patient monitor may send the patient data to cloud data processing module 142 for processing. The second condition may be the opposite of the first condition, whereby patient monitor 110 may alternate between processing the patient data at patient monitor 110 and transmitting the patient data to cloud data processing module 142 based on whether the first condition is met or the second condition is met.

In other words, during a first duration, the first condition may be met and the second condition may not be met, and patient monitor 110 may process the patient data locally. During a second duration, the first condition may not be met and the second condition may be met, and patient monitor 110 may send the patient data to cloud data processing module 142. During a third duration, the second condition may not be met, and the first condition may be met, whereby the patient monitor may resume processing of the patient data locally. In this way, the patient monitor may toggle between sending the patient data to cloud data processing module 142 for processing and processing the patient data locally at patient monitor 110 based on the presence or absence of the first condition and the second condition.

In various embodiments, the first condition may include patient monitor 110 not being connected to the network 160, and the second condition may include patient monitor 110 being connected to the network 160. In other words, when patient monitor 110 is connected to the network 160, the patient data may be transmitted to cloud data processing module 142 for processing, and when patient monitor 110 is not connected to the network 160, the patient data may be processed locally at patient monitor 110.

In some embodiments, the first condition may also include a display of patient monitor 110 (e.g., a screen of a UI 136 of FIG. 1B) being turned on, and the second condition may include the display of patient monitor 110 not being turned on. In other words, if the display of patient monitor 110 is turned on, it may be inferred that a caregiver may be viewing the patient data on the display. If a caregiver is viewing the patient data on the display, processing and/or analysis of the patient data carried out at cloud data processing module 142 may cause a delay or a lag time and the presentation of the patient data on the display as a result of a time taken for the patient data to be transmitted from cloud data processing module 142 to patient monitor 110. To avoid the delay or lag time, when patient monitor 110 is turned on, the transmission of the patient data to server 140 may be terminated and processing and/or analysis of the patient data may be performed at patient monitor 110 rather than cloud data processing module 142.

In other embodiments, either or both of the first condition and the second condition may include other criteria. For example, the patient data may be processed locally at patient monitor 110 rather than cloud data processing module 142 if a defect or error is detected in cloud data processing module 142, or if a congestion level of the network 160 exceeds a threshold congestion level, or for a different reason. Alternatively, the patient data may be processed by cloud data processing module 142 rather than locally at patient monitor 110 if a charge of a battery of patient monitor 110 (e.g., battery 134 of FIG. 1B) is below a threshold charge, or if defect is detected at the local data processing module. It should be appreciated that the examples described herein are for illustrative purposes, and the first condition and/or the second condition other criteria may depend on other criteria without departing from the scope of this disclosure.

In various embodiments, the patient data received at the receiver module 204 may be sent to a sample buffer 220. The sample buffer 220 may store samples of the patient data corresponding to a time window. For example, the time window may be 30 seconds, where the sample buffer 220 may store the last 30 seconds of patient data received at the receiver module 204. As described in greater detail below, the sample buffer 220 may be used to facilitate a smooth transfer between a processing of the patient data at patient monitor 110 and a processing of the data at cloud data processing module 142.

If the first condition is met and the second condition is not met, the patient data received at the receiver module 204 and stored in the sample buffer 220 may be processed locally by one or more algorithms 206. The result of the local processing of the patient data by applying the one or more algorithms 206 may be to generate a health status of the patient. The health status of the patient may indicate that one or more actions may need to be taken with the patient, or the health status may indicate that no action may need to be taken with the patient. In some embodiments, to determine the health status of the patient, an algorithm of the one or more algorithms 206 may determine whether values of the received patient data fall within a desired or expected range of values. If one or more values of the receipt patient data do not fall within the desired or expected range of values, the health status may indicate that attention is recommended for the patient. The desired or expected range of values may be retrieved from a memory of patient monitor 110 (e.g., the memory 132). For example, the desired or expected range of values may be retrieved from one or more lookup tables stored in the memory.

If attention is recommended for the patient, the processed patient data (e.g., the health status) may be sent to an alarm generator 208. The alarm generator 208 may generate an alarm to be received by a caregiver located at the patient, where the alarm may be displayed in a display 210 of patient monitor 110. The display 210 may be a part of UI 136 of patient monitor 110, as shown in FIG. 1B. Various different types of alarms may be generated at the alarm generator 208, depending on the processed patient data received at the alarm generator 208. An alarm may display a generic or specific visual alarm component based on the health status. Alternatively or additionally, the alarm may highlight some or all of the patient data displayed on the display 210, change one or more colors of different visual elements displayed on the display 210, and/or otherwise change an appearance of the visual elements and/or patient data. For example, a visual element may alternately appear and disappear (e.g., flash) or an intensity of the visual element may change over time (e.g., pulse). In some embodiments, the alarm may include an audio alarm, such as a tone, or beeping, or a different sound notifying the caregiver to consult patient monitor 110.

As an example, the received patient data may include blood pressure values of a patient. The algorithm 206 may consult a lookup table stored in the memory of patient monitor 110 to determine an upper blood pressure threshold value and a lower blood pressure threshold value of the patient. If the blood pressure values of the patient are within the upper and lower blood pressure threshold values, a first health status of the patient may be generated by an algorithm 206, where the first health status may indicate that the blood pressure of the patient may be acceptable for the patient under current circumstances. Alternatively, if a blood pressure value of the patient exceeds the upper blood pressure threshold value, or decreases below the lower blood pressure threshold value, a second health status of the patient may be generated by the algorithm 206, where the second health status may indicate that the blood pressure of the patient is not acceptable for the patient under current circumstances, whereby attention to the patient may be recommended.

Either of the first health status and the second health status may be displayed on the screen of the display 210. Further, in various embodiments, the first health status or the second health status may be displayed on the display 210 concurrently with the received patient data (e.g., the blood pressure values of the patient from which the health status was determined). Displaying the health status of the patient on the display 210 may include turning on the display 210, if the display 210 is currently switched off. In addition to the health status of the patient, the received (e.g., unprocessed) patient data and/or other processed patient data (e.g., not including the health status) generated by the algorithm 206 may be displayed on the display 210 concurrently with the health status of the patient.

If the blood pressure of the patient is determined to be normal, no further action may be taken at patient monitor 110 and patient monitor 110 may continue monitoring the patient data. As such, if the display 210 is switched off, the display 210 may not be switched back on. Alternatively, if the blood pressure is determined not to be acceptable, and/or it is determined that attention is recommended for the patient, an alarm may be generated by the alarm generator 208. In one embodiment, the alarm may generate a flashing red icon associated with blood pressure, and highlight a portion (e.g., a concerning portion) of the patient data (e.g., the blood pressure).

Thus, when the first condition is met and the second condition is not met, the patient data received at the receiver module 204 may be stored in the sample buffer 220 and processed by the algorithm 206. The received patient data and/or one or more results of the one or more algorithms 206 may be displayed on the display 210 so that a caregiver located at the patient may view the patient data, the health status, and/or other results of the one or more algorithms 206. If the health status is not expected and/or desired, the alarm generator 208 may generate an alarm which may also be viewed on the display 210.

However, if the first condition is not met and the second condition is met, the patient data received at the receiver module 204 and stored in the sample buffer 220 may not be processed by the algorithm 206, and the patient data received and preprocessed at the receiver module 204 may be sent to a raw communication module 226 of patient monitor 110. The raw communication module 226 may prepare the patient data to be sent to server 140 over the network 160. For example, the raw communication module 226 may encrypt, compress, or otherwise preprocess the patient data prior to transmission of the patient data over the network 160. When the patient data sent by the raw communication module 226 is received at server 140, cloud data processing module 142 may process the patient data. As described in reference to the receiver module 204 above, an initial processing step may be performed to decrypt, filter, and/or mitigate any missing data packets of the patient data.

In various embodiments, one or more algorithms that are the same as the one or more algorithms 206 may be applied to the patient data transmitted by the raw communication module 226 at cloud data processing module 142. In other words, the processing of the patient data received from the sensors 170 by the one or more algorithms 206 of patient monitor 110 may be the same as or substantially similar to the processing of the patient data at cloud data processing module 142, where substantially similar means that a variance between the processing of the patient data by the one or more algorithms 206 and the processing of the patient data by the one or more algorithms of cloud data processing module 142 may be accounted for by differences in processing power, memory, data transmission speeds, and the like. Thus, a result of processing the patient data at patient monitor 110 and a result of processing the patient data at cloud data processing module 142 may be substantially the same. For example, the processing of the patient data by the one or more algorithms 206 of the patient monitor may generate a first result, and the processing of the same patient data by cloud data processing module 142 may generate a second result, where the second result may be the same as the first result.

Either or both of the received patient data and the processed patient data may subsequently be stored by cloud data processing module 142 in the hospital information system 150. After the received patient data and/or the processed patient data is stored in the hospital information system 150, the remote caregiver 190 may access the received patient data and/or the processed patient data via server 140. For example, the remote caregiver 190 may request some or all of the received patient data processed patient data from server 140 over the network 160, which may be displayed on a screen of a wireless device of the remote caregiver 190. In this way, the remote caregiver 190 may consult or monitor the patient data when not physically at the patient.

As described above in reference to patient monitor 110, an alarm may be triggered during processing of the patient data at cloud data processing module 142 if the patient data is detected to be outside a desired and/or expected range for the patient. If an alarm is triggered at cloud data processing module 142, alarm data may be sent back to patient monitor 110 via the network 160. The alarm data may include the processed patient data including the health status. The alarm data may be received at patient monitor 110 by a communication module 212, which may decrypt, filter, or otherwise prepare the received alarm data for processing by the alarm generator 208. The communication module 212 may send the alarm data to the alarm generator 208, which may generate an appropriate alarm to display on the display 210 based on the alarm data. When alarm data is received at patient monitor 110, in various embodiments, the transmission of the patient data from the raw communication module 226 to server 140 over the network 160 may be terminated, and processing of the patient data may be resumed at the local data processing module via the one or more algorithms 206.

When switching from processing the patient data at cloud data processing module 142 to processing the patient data at patient monitor 110, a discontinuity in the processing may occur. To reduce the discontinuity and facilitate a smooth transfer of the processing of the patient data from cloud data processing module 142 to patient monitor 110, cloud data processing module 142 may periodically send state data of cloud data processing module 142 (e.g., a state of the processing of the patient data by a cloud data processing module 142) to patient monitor 110. For example, the state data may be sent every 1 second, or every 5 seconds, or longer, as long as the state data is sent more frequently than a length in time of the sample buffer. The state data may include a data vector comprising recent health status data generated over a duration (e.g., a time window), where the duration may begin at a point in time in the past and extend until the current time. For example, the point in time may be a time of a previous transmission of state data. The state data and/or the data vector may also include patient data used to generate the recent health status data.

In some embodiments, the state data may include an internal state of the one or more algorithms 206, so that the state data can be used to initialize the internal state of the one or more algorithms 206 when a location where the one or more algorithms 206 are executed is switched from the patient monitor 110 to the server 140, and/or vice versa. Additionally or alternatively, the sample buffer 220 may be used to maintain the algorithm up to date with the latest samples. For example, if the state data is sent every 30 seconds to the state buffer 222, then the sample buffer 220 may maintain up to 30 seconds of samples received from the one or more sensors 170. Combining data from the sample buffer 220 and the state buffer 222 may allow for a more comprehensive replication of the state of the algorithm between the patient monitor 110 and the server 140. This kind of internal state transfer may relied on, for example, if an algorithm of the one or more algorithms 206 use infinite impulse response (IIR) filtering, where a current state depends on a theoretically infinite amount of historical data.

The state data may be periodically sent from cloud data processing module 142 to the communication module 212 over the network 160. The communication module 212 may store the state data in a state buffer 222. Thus, when the processing of the patient data at cloud data processing module 142 is terminated and the processing of the patient data at the local data processing module via the one or more algorithms 206 is resumed, the state data stored in the state buffer 222 may be used by the one or more algorithms 206. In some embodiments, the state data stored in the state buffer 222 may be used to initialize the one or more algorithms 206 upon resuming processing of the patient data.

For example, an algorithm of the one or more algorithms 206 may determine whether the health status of the patient is trending in a certain direction. To determine whether a trend exists in the patient's health status, the algorithm may compare a current health status to a number of recent health statuses generated by the one or more algorithms 206 and stored in a memory of patient monitor 110. However, if the processing of the patient data is being resumed at patient monitor 110 after being performed at cloud data processing module 142, sufficient health status information may be available at patient monitor 110 to detect a trend. To ensure that sufficient historical health status information is available at patient monitor 110, health status information generated at cloud data processing module 142 may be periodically sent to patient monitor 110 and stored in the state buffer 222.

Further, a similar situation may occur when terminating processing of the patient data at patient monitor 110 and initiating processing of the patient data at cloud data processing module 142, whereby sufficient recent health status data of the patient may not be available at cloud data processing module 142 to detect trends in the health status of the patient. To make sufficient recent health status data of the patient available at cloud data processing module 142, the one or more algorithms 206 may also store local state data in the state buffer 222. If at a later time the patient data is sent to cloud data processing module 142 for processing, the local state data stored in the state buffer 222 may also be sent to cloud data processing module 142 via the communication module 212. The local state data may subsequently be used by cloud data processing module 142 in the processing of the patient data.

In other words, when the processing of the patient data is being carried out at cloud data processing module 142, the state buffer 222 may store remote state data periodically sent to patient monitor 110 by cloud data processing module 142, so that during a transfer of processing to patient monitor 110, the one or more algorithms 206 may access the remote state data. During processing of the patient data at patient monitor 110, the one or more algorithms 206 may replace the remote state data in the state buffer 222 with local state data periodically transmitted to the state buffer 222. If or when the processing of the patient data is later resumed at cloud data processing module 142, the local state data in the state buffer 222 may be sent to cloud data processing module 142, so that during a transfer of processing to cloud data processing module 142, the one or more remote algorithms at cloud data processing module 142 may access the local state data. During processing of the patient data at cloud data processing module 142, the local state data in the state buffer 222 may be replaced by the remote state data sent from cloud data processing module 142. In this way, as the processing of the patient data is switched back and forth between patient monitor 110 and cloud data processing module 142, a health status trend analysis of a patient may yield consistent results.

A transitioning of processing the patient data between patient monitor 110 and cloud data processing module 142 may be clarified by FIGS. 2B-2E, which illustrate various examples of how such transitioning might occur.

FIG. 2B shows a first data communication flow diagram 250 illustrating a flow of data between the one or more sensors 170, patient monitor 110, and server 140 of a wireless patient monitoring system (e.g., the wireless patient monitoring system 120 of FIG. 1B), when a connection between patient monitor 110 and the wireless network 160 is lost. As described above, when the connection is lost, the processing of the patient data may transition from being performed at server 140 (e.g., at cloud data processing module 142 of server 140), to being performed at patient monitor 110 (e.g., local data processing module 126 of patient monitor 110).

In a first state 252 of the wireless patient monitoring system, the processing of the patient data is carried out at server 140. During the first state 252, the patient data is first received at patient monitor 110 from the sensors 170 and stored in the sample buffer 220. The patient data is sent to server 140, where the patient data is processed at cloud data processing module 142. State data of cloud data processing module 142 is periodically sent back to patient monitor 110, where the state data is stored in state buffer 222 of patient monitor 110.

At a time T, the connection between patient monitor 110 and the network 160 is lost, whereby patient monitor 110 may no longer transmit the patient data to the server. As a result of detecting that the connection between patient monitor 110 at the network 160 has been lost, in a second state 254 of the wireless patient monitoring system, the patient monitor may terminate the transmission of patient data to server 140, and initiate local processing of the patient data at patient monitor 110. During the second state 254, the patient data may be received from the sensors 170 (e.g., patient monitor 110 may have a wired connection to the sensors 170) and stored in the sample buffer 220. Patient monitor 110 may process the patient data locally at patient monitor 110. Additionally, the patient monitor may validate the state data stored in the state buffer 222, which the patient monitor had been receiving from server 140 while the processing of the patient data was be carried out at server 140. Validation of the patient data is described in greater detail below in reference to FIG. 4. Patient monitor 110 may store local state data in the state buffer 222.

FIG. 2C shows a second data communication flow diagram 260 illustrating a flow of data between the one or more sensors 170, patient monitor 110, and server 140 of the wireless patient monitoring system when an alarm is triggered during processing of the patient data on server 140.

In a first state 262 of the wireless patient monitoring system, the processing of the patient data is carried out at server 140. During the first state 262, the patient data is first received at patient monitor 110 from the sensors 170 and stored in the sample buffer 220. The patient data is sent to server 140, where the patient data is processed at cloud data processing module 142. State data of cloud data processing module 142 is periodically sent back to patient monitor 110, where the state data is stored in state buffer 222 of patient monitor 110.

At a time T, an alarm is triggered at cloud data processing module 142. When the alarm is triggered, alarm data may be sent from server 140 to patient monitor 110. In various embodiments, the alarm data may include, for example, the patient data that triggered the alarm and a set of criteria used to determine a triggering of the alarm. When patient monitor 110 receives the alarm data from server 140, in a second state 264 of the wireless patient monitoring system, the patient monitor may terminate the transmission of patient data to server 140 and initiate local processing of the patient data at patient monitor 110. During the second state 264, the patient data may be received from the sensors 170 and stored in the sample buffer 220. The one or more algorithms 206 may process the patient data locally at patient monitor 110, and the patient data may not be sent to server 140. The patient monitor may validate the alarm data received from server 140 based on a result of the local processing of the patient data. For example, if the local processing of the patient data triggers an alarm at the one or more algorithms 206, the alarm data sent from server 140 may be validated. If the alarm data is validated, the alarm generator 208 of patient monitor 110 may display an appropriate alarm on the display 210, along with corresponding patient data. Local state data (e.g., the state of the processing of the patient data at patient monitor 110) may be stored in the state buffer 222.

FIG. 2D shows a third data communication flow diagram 270 illustrating a flow of data between the one or more sensors 170, patient monitor 110, and server 140 of the wireless patient monitoring system when the display 210 of patient monitor 110 is switched off (e.g., switched from an on state to an off state). A normal state of the patient monitor may include the display 210 of the patient monitor being turned off, as a caregiver may periodically view patient data on the display and not continuously view the patient data. By turning the display 210 off, a charge of the battery may be preserved and a time during which patient monitor 110 is operated without being recharged may be increased. Additionally, a heat generated by patient monitor 110 may be reduced by turning off the display, where the heat may generate discomfort for the patient. As described above, when the display 210 is switched on, it may be inferred that a caregiver is viewing the display 210, whereby the processing of the patient data may be performed locally by the one or more algorithms 206, which may result in a faster rendering of the health status of the patient on the display 210 than if the health status of the patient is transmitted from server 140.

In a first state 272 of the wireless patient monitoring system, the display 210 is switched on, and the processing of the patient data is carried out at patient monitor 110. During the first state 272, the patient data is received at patient monitor 110 from the sensors 170 and stored in the sample buffer 220. The patient data is processed locally by the one or more algorithms 206, and local state data is stored in state buffer 222 of patient monitor 110. The health status and/or processed patient data generated by the one or more algorithms 206 may be displayed on the display 210 for an attending caregiver to view. Additionally, any alarms generated by the alarm generator 208 may be displayed on the display 210.

At a time T, the display 210 is switched off. For example, the caregiver viewing the display 210 may switch the display 210 off after the caregiver has viewed a sufficient amount of the patient data or become sufficiently aware of the patient's health status. When the display 210 is switched off, in a second state 274 of the wireless patient monitoring system, the patient monitor may resume the transmission of patient data to server 140 to be processed by cloud data processing module 142. During the second state 274, the patient data may be received from the sensors 170 and stored in the sample buffer 220. The patient data may be sent to server 140, and additionally, the local state data stored in the state buffer 222 may be sent to server 140. One or more algorithms of cloud data processing module 142 may be initialized with the local state data, such that the processing of the received patient data may continue from a previous state of the processing at patient monitor 110. As the processing of the patient data is carried out, state data of cloud data processing module 142 may be periodically sent back to patient monitor 110, where the state data is stored in state buffer 222 of patient monitor 110, replacing the local state data from the first state 272.

Figure 3:
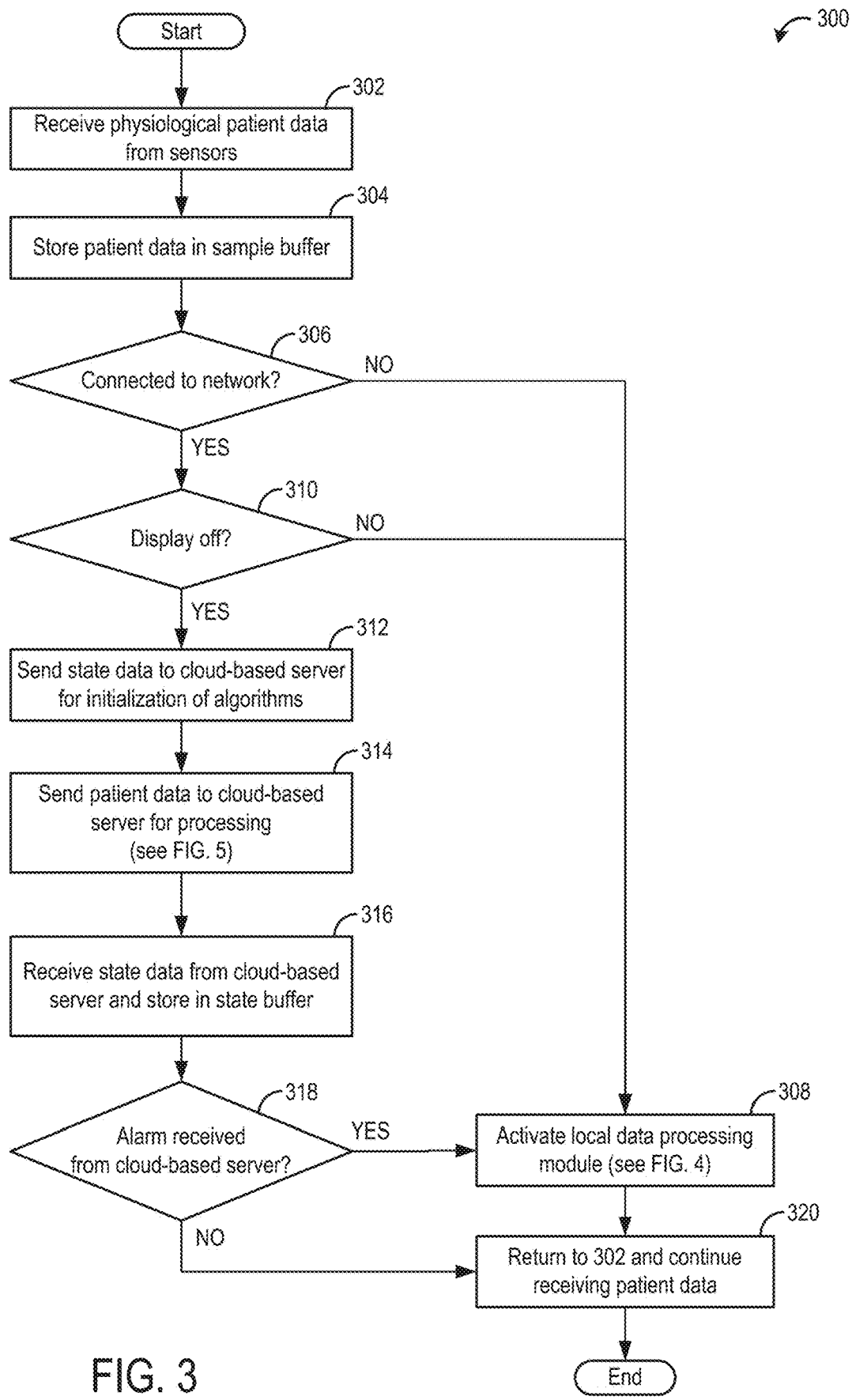
FIG. 3 is a flowchart illustrating an exemplary method for a patient monitor for determining whether processing of patient data occurs at the patient monitor or at a cloud-based server, in accordance with one or more embodiments of the present disclosure.

Referring now to FIG. 3, an exemplary method 300 is shown for a patient monitor for transitioning between processing patient data at the patient monitor or at a cloud-based server. Method 300 and other methods described herein are described with reference to a patient monitoring system of a hospital, such as patient monitoring system 120 of FIG. 1B, where the patient monitor may be a non-limiting embodiment of patient monitor 110. Method 300 may be implemented via computer-readable instructions stored in a memory of the patient monitor, and executed by a processor of the patient monitor, such as memory 132 and processor 130 of patient monitor 110.

Method 300 begins at 302, where method 300 includes receiving physiological patient data of a patient of the hospital from one or more sensors (e.g., the one or more sensors 170) connected to the patient monitor. The one or more sensors may be arranged on a body of the patient while the patient is receiving treatment, and may include, for example, a 3-lead ECG sensor, a pulse oximetry sensor, a blood pressure sensor, a digital stethoscope, a respiratory sensor, a temperature sensor, or a different kind of sensor. The one or more sensors may be coupled to the patient monitor via a wired connection, or the one or more sensors may be wirelessly connected to the patient monitor. For example, the one or more sensors may be wirelessly connected to the patient monitor via a Wi-Fi connection with an access point of a wireless network (e.g., network 160) of the hospital, or the one or more wireless sensors may be wirelessly connected to the patient monitor via a personal area network (PAN) using a short-range wireless protocol such as Bluetooth®. In various embodiments, the one or more sensors may be wirelessly connected to the patient monitor via a Medical Area Body Network (MBAN).

In some embodiments, the physiological patient data collected from the one or more sensors may undergo some processing at the one or more sensors, and a result of the processing of the physiological patient data at the one or more sensors may be transmitted to the patient monitor in addition to the physiological patient data.

At 304, method 300 includes storing the physiological patient data in a sample buffer (e.g., the sample buffer 220) of the patient monitor. The sample buffer may store an amount of the physiological patient data collected during a window of time, and may be structured using first-in, first-out (FIFO) queuing. For example, the physiological patient data may be received as a series of values (e.g., measurements). A first value received may be stored in the sample buffer at a first location in memory, where it may be retrieved at a data processing module of the patient monitor for subsequent processing. A second value received may then be stored in the sample buffer at the first location in memory, where it may be retrieved by the data processing module, and the first value received may be shifted to a second location in memory. A third value may be stored in the sample buffer at the first location in memory, where may be retrieved by the data processing module and the first value received may be shifted to a third location in memory, and the second value received may be shifted to the second location in memory. In this way, as data values are received from the one or more sensors, the data values are first made available to the data processing module and subsequently stored until a number of stored data values exceeds a size of the sample buffer. When the number of stored data values exceeds the size of the sample buffer, be stored data values are discarded in the order they were received. By storing the data values in the sample buffer, the data processing module may have access to recent historical physiological patient data of the patient. The recent historical physiological patient data may be used to identify trends in the physiological patient data. The recent historical physiological patient data may also be used to provide a historical context during initialization of a remote data processing module (e.g., cloud data processing module 142 of FIG. 2A) when processing of the patient data is transferred from the patient monitor to a server, as described in greater detail below.

At 306, method 300 includes determining whether the patient monitor is connected to a wireless local area network (WLAN) of the hospital. As an example, the patient may be receiving treatment at a first location of the hospital, the first location including a first access point (AP) of the WLAN (also referred to herein as the network), whereby the patient monitor may be connected to the network. The patient may be moved to a second location of the hospital, the second location including a second AP of the network. As the patient is being transferred from the first location to the second location, the patient monitor may lose its connection to the network as a signal strength of the first AP decreases. The patient may pass through an area in which no APs are present, whereby the patient monitor may not be connected to the network. When the patient reaches the second location, the patient monitor may be connected to the network via the second AP.

If at 306 is determined that the patient monitor is not connected to the network, method 300 proceeds to 308. At 308, method 300 includes activating a local data processing module of the patient monitor to process the physiological patient data received from the one or more sensors and stored in the sample buffer. Activation of the local data processing module is described in greater detail below in reference to FIG. 4.

If at 306 it is determined that the patient monitor is connected to the network, method 300 proceeds to 310. At 310, method 300 includes determining whether a display (e.g., the display 210 of FIG. 2A) of the patient monitor is switched off. If at 310 it is determined that the display is not switched off (e.g., the display is turned on), method 300 proceeds to 308, and the local data processing module is activated. If at 310 it is determined that the display is switched off, method 300 proceeds to 312.

At 312, method 300 includes sending state data (e.g., reflecting a state of the processing of the physiological patient data) to a data processing module of the cloud-based server (e.g., cloud data processing module 142). The state data may be stored in a state buffer, such as the state buffer 222 of FIG. 2A. as described above, the state data may be used to initialize one or more algorithms of the cloud data processing module for processing of physiological patient data transmitted to the cloud-based server over the network.

At 314, method 300 includes sending the physiological patient data to the cloud-based server for processing. Processing of the physiological patient data at the cloud-based server is described in greater detail below, in reference to FIG. 5.

At 316, method 300 includes receiving remote state data from the cloud-based server and storing the remote state data in the state buffer of the patient monitor. The remote state data transmitted from the cloud-based server may replace the local state data previously stored in the state buffer of the patient monitor. Thus, the state buffer of the patient monitor may store data representing the state of the processing at a time when the state data enters the state buffer, whether the processing is carried out locally at the patient monitor, or whether the processing is carried out remotely at the cloud data processing module.

The state buffer may store an amount of the processing state data collected during a window of time, and may be structured using FIFO queuing, as described above in reference to the sample buffer. For example, the state data may comprise one or more vectors of data values, where the vectors of data values and/or the data values themselves represent results of processing the physiological patient data. In various embodiments, the vectors and/or the data values may represent a health status of the patient. In some embodiments, the state buffer may store one or more "snapshots" of an internal state of one or more algorithms.

At 318, method 300 includes determining whether alarm data has been received from the cloud-based server, indicating that an alarm was triggered during processing of the patient data at the cloud data processing module. As described above, the alarm may be triggered as a result of values of the patient data being outside a desired range of values. For example, if a blood pressure of the patient exceeds a threshold blood pressure, an alarm may be triggered at the cloud data processing module. As a result of the alarm being triggered, the patient data may be sent to the patient monitor.

If at 318 it is determined that alarm data has been received from the cloud-based server, method 300 proceeds to 308, and the local data processing module of the patient monitor is activated. When the local data processing module of the patient monitor is activated, the patient data may not be transmitted to the cloud-based server, and the patient data may be processed at the patient monitor, as described in greater detail in FIG. 4 below.

If at 318 it is determined that no alarm data has been received from the cloud-based server, method 300 proceeds to 320. At 320, method 300 includes returning to 302 to continue receiving patient data. It should be appreciated that in various embodiments, method 300 may be executed iteratively or repeatedly while the patient monitor is in operation. In other words, the patient monitor may continuously receive the patient data from the sensors, and as the patient data is received, dynamically determine whether to send the patient data to be processed at the cloud-based server or to process the patient data locally at the patient monitor. Method 300 ends.

Figure 4:
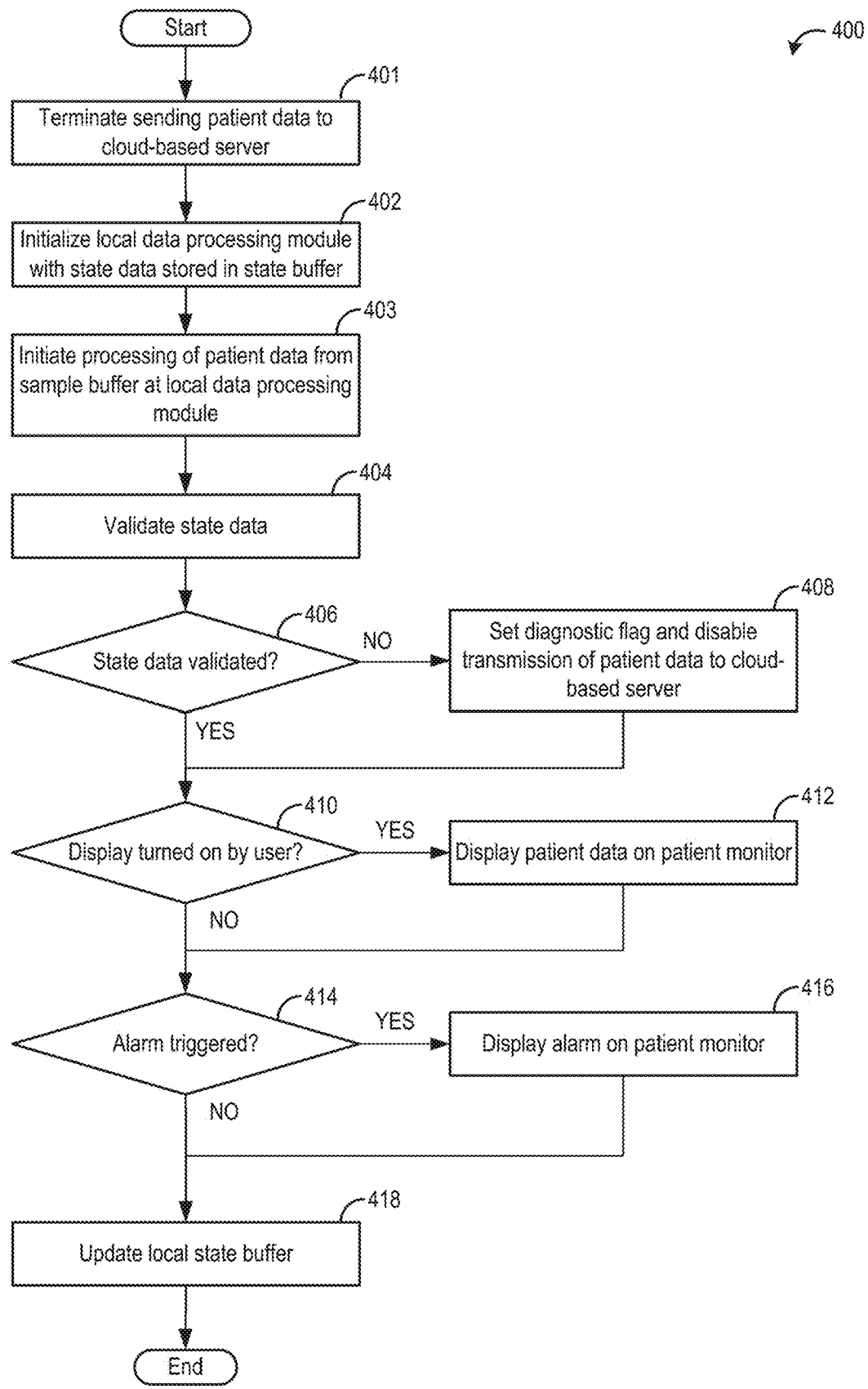
FIG. 4 is a flowchart illustrating an exemplary method for a patient monitor for processing and displaying patient data at the patient monitor, in accordance with one or more embodiments of the present disclosure.

Referring now to FIG. 4, an exemplary method 400 is shown for a patient monitor for processing patient data at a local data processing module of the patient monitor, such as local data processing module 126 of FIG. 1B. Method 400 may be implemented via computer-readable instructions stored in a memory of the patient monitor, and executed by a processor of the patient monitor, such as memory 132 and processor 130 of patient monitor 110 of FIGS. 1A and 1B.

Method 400 begins at 401, where method 400 includes terminating sending patient data received from sensors (e.g., the one or more sensors 170 of FIG. 2A) arranged at the patient to a cloud-based server (e.g., server 140). For example, the patient data may have been transmitted to the cloud-based server for remote processing while a display (e.g. display 210) of the patient monitor was switched off, and in response to the display of the patient monitor being switched on, the transmission of the patient data to the cloud-based server may be discontinued and the patient data may be processed at the patient monitor. Alternatively, a connection between the patient monitor and a wireless network (e.g. wireless network 160) may be lost, and as a result of the connection being lost, the transmission of patient data to the cloud-based server may be discontinued.

At 402, method 400 includes initializing the local data processing module with state data stored in the state buffer. Initializing the local data processing module with the state data stored in the state buffer may include initializing one or more algorithms (e.g., the one or more algorithms 206 of FIG. 2A) of the local data processing module with the state data. For example, an algorithm of the one or more algorithms may determine a trend in the patient data, or seek to identify a pattern in the patient data over a time period, where the patient data received from the sensors may not initially be sufficient to determine the trend or identify the pattern. By initializing the algorithms with state data representing a previous state of processing of patient data from the patient, an amount of patient data may be sufficient to determine the trend or identify the pattern. Thus, initializing the local data processing module may allow the processing of patient data at the local data processing module to continue from a point at which processing of the patient data at the cloud data processing module left off.

At 403, method 400 includes initiating processing of patient data stored in a sample buffer at a local data processing module (e.g., sample buffer 220 of local data processing module 126). As described above in reference to FIGS. 2A-2E, the patient data may be processed by one or more algorithms of the local data processing module, which may be the same as or substantially similar to a corresponding one or more algorithms of the cloud-based server. For example, the patient data may comprise values corresponding to measurements taken of the patient (e.g., a blood pressure measurement, and ECG measurement, etc., and processing the patient data may include comparing the measurements to reference measurements stored in a memory of the patient monitor (e.g., memory 132 of FIG. 1B). Comparing the measurements to the reference measurements may include determining whether one or more measurements exceed an upper threshold or decrease below a lower threshold of a desired range of measurements, where the desired range of measurements may be stored in the memory. For example, the desired range of measurements may be stored in a lookup table of the memory. In various embodiments, comparing the measurements to the reference measurements and/or processing the patient data may include analyzing the patient data over a series of steps. For example, in a first step, measurements of the patient data may be compared with a first desired range of measurements; in a second step, measurements of the patient data may be compared with the second desired range of measurements; in a third step, measurements of the patient data may be compared with a third desired range of measurements, and so forth.

As a result of processing the patient at the local data processing module, the one or more algorithms may output health status information of the patient. The health status information may include an encoding of a general health status. For example, the one or more algorithms may output a first encoding if immediate attention is recommended for the patient, and a second encoding if immediate attention is not recommended for the patient. The health status information may include various data, which may depend on a type of sensor data processed at the local data processing module. For example, the health status information may include a classification of the patient (e.g., out of a plurality of potential classifications) based on a blood pressure measurement of the patient, where the classification may indicate a relative health of the patient.

Other types of analysis may also be performed on the patient data. In some embodiments, one or more statistical analyses may be performed on the patient data. For example, a number of different measurements of the patient data may be analyzed, and processing the number of different measurements may include determining a mean, a median, a standard deviation, and/or a different kind of statistical measurement of the number of different measurements. In other embodiments, regressions may be performed, or advanced statistical techniques may be used to identify patterns in high dimensional patient data. In some embodiments, processing the patient data may include using artificial intelligence (AI) and/or machine learning (ML) techniques to classify and/or predict measurements of the patient data. It should be appreciated that the examples provided herein are for illustrative purposes, and additional and/or different types of processing may be applied to the patient data without departing from the scope of this disclosure.

Additionally, in some embodiments, the patient data received from the sensors may include results of processing physiological patient data at the sensors. In other words, in some embodiments, a portion of the processing performed on the patient data at the patient monitor as described above may be alternatively performed at the sensors, whereby a total amount of processing performed on the patient data at the patient monitor may be reduced.

At 404, method 400 includes validating state data stored in a state buffer (e.g., state buffer 222 of FIG. 2A). The state data stored in the state buffer may include one or more previous states of processing of the patient data. For example, the state buffer may include a first data vector, where state data of the first data vector describes a state of processing of the patient data at a first time; a second data vector, where state data of the second data vector describes a state of data processing of the patient data at a second time; and so on. The state data may have been received during periodic transmissions from the cloud-based server, or the state data may have been generated during processing of the patient data at the patient monitor. For example, when processing of the patient data begins at the local data processing module of the patient monitor after a duration of processing the patient data at the cloud data processing module, the state buffer may include state data received at the patient monitor from the cloud data processing module at regular intervals of the duration.

In various embodiments, validating the state data stored in the state buffer may include determining, for one or more data vectors of the state data, whether a state of processing of the patient data described by the one or more data vectors matches a state of processing of the patient data generated by the local data processing module. For example, a first data vector of the state data may describe a first state of the processing of the patient data at the cloud data processing module at a first point in time (e.g., a recent point in time). During initiation of processing of the patient data at the local data processing module, a second data vector may be generated by the local data processing module describing a state of the processing of the patient data at the local data processing module at a second point in time (e.g., at a current point in time). If a distance between the first data vector and the second data vector is within a threshold distance, the state data described by the first data vector may be validated. If the distance between the first data vector the second data vector exceeds the threshold distance, the state data described by the first data vector may not be validated.

At 406, method 400 includes determining whether the state data is validated. If the state data is not validated at 406, method 400 proceeds to 408. At 408, method 400 includes setting a diagnostic flag at the cloud-based server. The diagnostic flag may be an indication that the processing of the patient data at the cloud data processing module of the server is not generating the same or similar results as the processing of the patient data at the local data processing module. A difference between results of processing that patient data at the cloud data processing module and processing the patient data at the local data processing module may be an indication of a defect at the cloud data processing module. The diagnostic flag may later be consulted by an administrator of the server. In various embodiments, setting the diagnostic flag may include disabling transmission of patient data to the cloud-based server (e.g., when conditions are met for transmitting the patient data to the cloud-based server).

If the state data is validated at 406, method 400 proceeds to 410. At 410, method 400 includes determining whether or not a display of the patient monitor has been turned on by the user. If at 410 it is determined that the display has been turned on by the user, method 400 proceeds to 412. At 412, method 400 includes displaying the patient data on the display of the patient monitor. If at 410 it is determined that the display has not been turned on by the user, method 400 proceeds to 414.

At 414, method 400 includes determining whether an alarm has been triggered at the local algorithm module. If at 414 it is determined that an alarm has been triggered at the local algorithm module, method 400 proceeds to 416. At 416, method 400 includes displaying a corresponding alarm on the display of the patient monitor. The corresponding alarm may be selected and/or generated by an alarm generator module of the patient monitor, such as alarm generator 208 of FIG. 2A. in various embodiments, the alarm generator may receive alarm data from one or more algorithms of the local data processing module, and select an appropriate alarm based on the alarm data. Selecting the appropriate alarm based on the alarm data may include consulting one or more lookup tables stored in the memory of the patient monitor. For example, the alarm data may indicate that a blood pressure of the patient has exceeded a threshold blood pressure. In response to the alarm data indicating that the blood pressure has exceeded the threshold blood pressure, the alarm generator may select an alarm to display on the display of the patient monitor that indicates to a caregiver that the alarm is generated due to a blood pressure measurement of the patient. Alternatively, the alarm data may indicate that an ECG measurement of the patient is outside of the desired range of ECG measurements. In response to the alarm data indicating that the ECG measurement is outside of the desired range, the alarm generator may select an alarm that indicates to the caregiver that the alarm is generated due to an ECG measurement. The alarm selected for the blood pressure measurement may be different than the alarm selected for the ECG measurement, such that the caregiver may be able to easily determine a cause of the alarm by looking at the alarm.

If at 414 it is determined that alarm has not been generated at the local algorithm module, method 400 proceeds to 418. At 418, method 400 includes updating the state buffer of the patient monitor with processing state data generated at the local data processing module. As described above, the processing state data generated at the local data processing module may include one or more data vectors indicating a state of the processing at the local data processing module. In various embodiments, updating the state buffer may include replacing one or more data vectors stored in the state buffer with the one or more data vectors generated at the local data processing module. For example, the one or more data vectors generated at the local data processing module may replace the one or more data vectors stored in the state buffer in accordance with FIFO queuing, such that an order of the one or more data vectors of the state buffer maintain an order of processing the patient data.

For example, the state buffer may include 5 data vectors received from the cloud data processing module, where each of a first, second, third, fourth, and fifth remote data vector of the 5 data vectors represent a state of the processing of the patient data at a first, second, third, fourth, and fifth time, respectively, where the first time is the most recent time, the second time is the next most recent time, and so on until the fifth time, which is the oldest data vector of the state buffer. When processing is initiated at the local data processing module, the 5 data vectors may be replaced one by one, by new data vectors generated at the local data processing module (e.g., by one or more algorithms of the local data processing module). For example, a first local data vector generated at the local data processing module may enter the state buffer, and the fifth remote data vector (e.g., the oldest data vector) may be removed from the state buffer (e.g., deleted), whereby the state buffer may comprise the first local data vector, the first remote data vector, the second remote data vector, the third remote data vector, and the fourth remote data vector, which becomes the oldest data vector in the state buffer. After a time interval, a more recent local data vector generated at the local data processing module may enter the state buffer, and the fourth remote data vector (e.g., the oldest data vector) may be removed from the state buffer, whereby the state buffer may comprise the most recent local data vector, the first local data vector, the first remote data vector, the second remote data vector, and the third remote data vector, which becomes the oldest data vector in the state buffer. In this way, the state buffer may retain the five most recent data vectors representing the five most recent states of processing of the patient data. After updating the local state buffer, method 400 may end.

Figure 5:
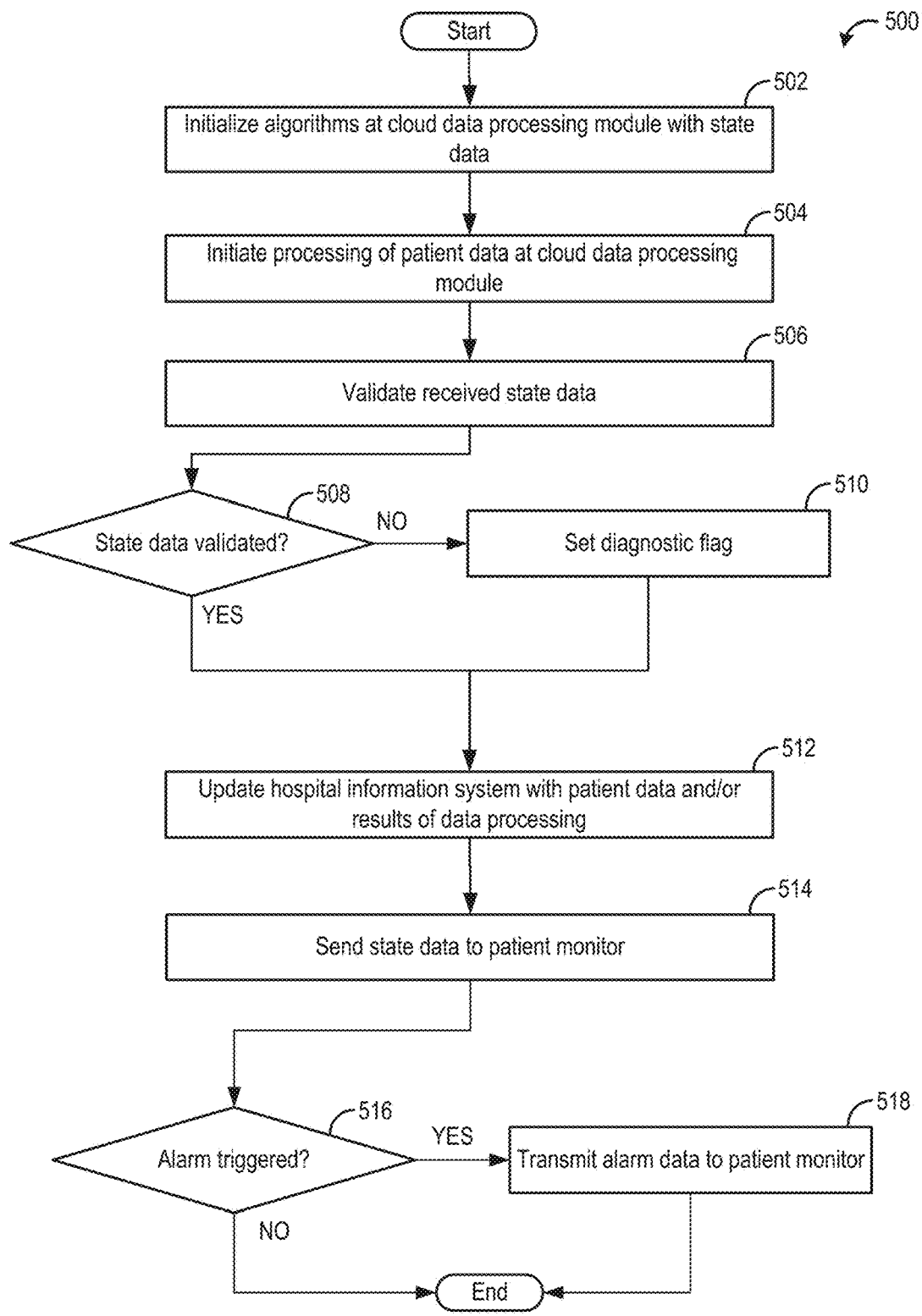
FIG. 5 is a flowchart illustrating an exemplary method for processing patient data at a cloud-based server, in accordance with one or more embodiments of the present disclosure.
Figure 6:
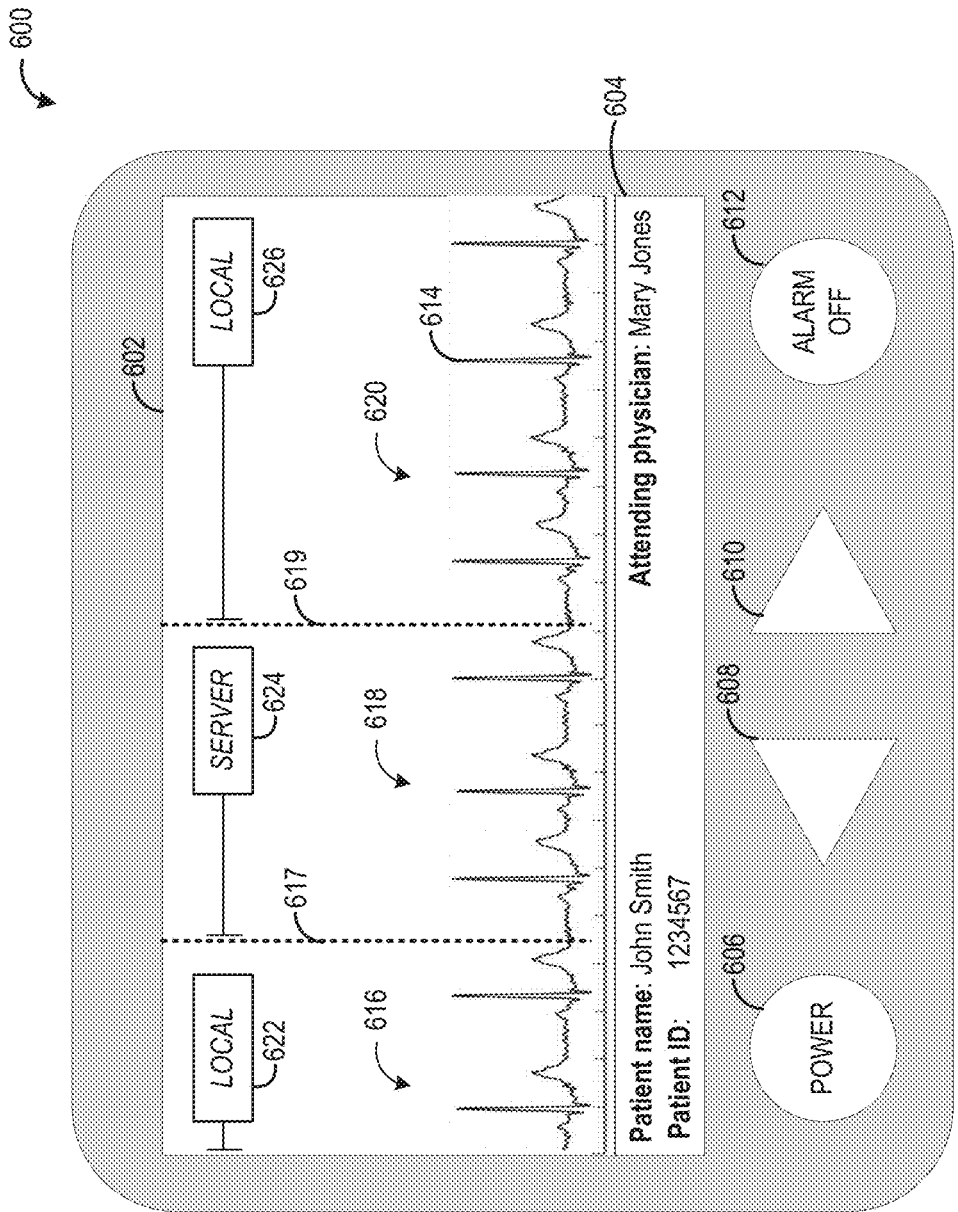
FIG. 6 shows an exemplary user interface of a patient monitor, in accordance with one or more embodiments of the present disclosure.

Referring now to FIG. 5, an exemplary method 500 is shown for processing patient data of a patient at a cloud data processing module of a cloud-based server accessed wirelessly by a patient monitor, such as local data processing module 126 of FIG. 1B. Method 500 may be implemented via computer-readable instructions stored in a memory of the server, and executed by a processor of the server.

Method 500 begins at 502, where method 500 includes initializing the cloud data processing module with state data received from the patient monitor (e.g., stored in the state buffer of the patient monitor). The initialization of the cloud data processing module may be similar to the initialization of the local data processing module described above in reference to FIG. 4.

At 504, method 500 includes initiating processing of patient data at the cloud data processing module with patient data received from the patient monitor. As the patient data begins to be processed, at 506, method 500 includes validating the state data received from the patient monitor and used to initialize the cloud data processing module. As described above, validating the state data received from the patient monitor may include generating state data at the cloud data processing module, and comparing the generated state data with the state data received from the patient monitor. If the generated state data is substantially similar to the state data received from the patient monitor, the state data may be validated.

At 508, method 500 includes determining whether the state data received from the patient monitor is validated. If the state data is not validated at 508, method 500 proceeds to 510. At 510, method 500 includes setting a diagnostic flag. As described above, the diagnostic flag may indicate that a result of processing the patient data at the patient monitor differs from a result of processing the patient data at the cloud data processing module, which may indicate a defect in one of the cloud data processing module and the local data processing module of the patient monitor.

If the state data is validated 508, method 500 proceeds to 512. At 512, method 500 includes updating one or more hospital information systems with the patient data and/or results of the processing of the patient data at the cloud data processing module. After the one or more hospital information systems have an updated, the patient data and/or the results of the processing of the patient data (e.g., a health status of the patient) may be made available to a caregiver of the patient, for example, on a wireless device of the caregiver.

At 514, method 500 includes sending state data to the patient monitor. As described above, state data comprising a state of the processing of the patient data at the cloud data processing module may be periodically sent to the patient monitor to be used for initializing the local data processing module in the event of a transfer of the processing of the patient data from the cloud data processing module to the local data processing module.

At 516, method 500 includes determining whether an alarm has been triggered by one or more algorithms of the cloud data processing module. Triggering of the alarm at the cloud data processing module may be similar to the triggering of the alarm at the local data processing module described above in reference to FIG. 4. If at 516 it is determined that alarm has been triggered, method 500 proceeds to 518.

At 518, method 500 includes transmitting the alarm data to the patient monitor. By transmitting the alarm data to the patient monitor, the cloud data processing module indicates that the alarm has been triggered, and upon receiving the alarm data, the patient monitor may proceed to activate the local data processing module, as described above in reference to FIG. 4. Method 500 ends.

Referring now to FIG. 6, an exemplary UI 600 of a patient monitor is shown, where the patient monitor may be a non-limiting embodiment of patient monitor 110 of FIGS. 1B and 2A.

UI 600 may include a display screen 602 (e.g., display 210 of FIG. 2A), a power button 606, a left scroll button 608, a right scroll button 610, and an alarm off button 612. When the patient monitor is turned on via the power button 606, patient data received at the patient monitor from sensors arranged, for example, on a body of a patient, may be displayed on the display screen 602. The patient data may be displayed on the display screen 602 in different ways depending on a type of patient data. In FIG. 6, the patient data is ECG data, and the ECG data is displayed on the display screen 602 as an ECG line 614. In various embodiments, the ECG data and/or other types of patient data may be displayed in real time as the patient data is received at the patient monitor. For example, the ECG line 614 may be scrolled continuously in real-time from a first side of the display screen 602 (e.g., the left side) to a second side of the display screen 602 (e.g. the right side). In other embodiments and/or with other types of patient data, the patient data may be displayed in real time on the display screen 602 using a different kind of a plot or graph, where the patient data may be displayed in a textual and/or iconic manner. For example, the patient data may be blood pressure data, and the blood pressure data may be displayed on the display screen 602 as numbers that are continuously updated as the patient data is received at the patient monitor.

The display screen 602 may include a display panel 604, which may display information about or relevant to the patient and/or the patient data. While in FIG. 6 the display panel 604 is included in a lower portion of the display screen 602, in other embodiments, the display panel 604 may be included in a different portion or part of the display screen 602. For example, the display panel 604 may be included in the upper portion of the display screen 602, or at one side of the display screen 602. The information displayed in the display panel 604 may include, for example, a name of the patient, an ID number or code of the patient, a name of an attending physician of the patient, a phone number or other contact information of the attending physician, and the like. It should be appreciated that the examples provided herein are for illustrative purposes, and other information and other types of information may be included in the display panel 604 without departing from the scope of this disclosure.

As described herein, the patient data received at the patient monitor may be processed by a local data processing module of the patient monitor, or by a cloud data processing module at a cloud-based server accessed by the patient monitor via a wireless network (e.g., server 140 and wireless network 160 of FIG. 1B). As the ECG data scrolls continuously across the display screen 602, an indication may be provided to a user of the patient monitor of where the processing of the patient data being displayed on the display screen 602 was performed. In various embodiments, portions the patient data displayed on the display screen 602 may be identified as having been processed at the local data processing module of the patient monitor, while other portions of the patient data displayed on the display screen may be identified as having been processed at the cloud data processing module of the server. The different portions of the patient data may be divided by one or more vertical dividers. For example, in FIG. 6, a first portion 616 of the patient data, at a left-hand side of the display screen 602, is identified as having been processed at the local data processing module by a local label 622. A second portion 618 of the patient data, at a center of the display screen 602, is identified as having been processed at the cloud data processing module of the server by a server label 624. A third portion 620 of the patient data, at a right-hand side of the display screen 602, is identified as having been processed at the local data processing module by a local label 626. A dividing line 617 may indicate a boundary between the first portion 616 and the second portion 618, and a dividing line 619 may indicate a boundary between the second portion 618 and the third portion 620. In this way, a caregiver viewing the patient data on the display screen 602 of the patient monitor may be able to easily determine where the patient data is currently being processed; when the patient data was being processed at the patient monitor and when the patient data was being processed at the server; and whether a specific value of the patient data was processed at the patient monitor or at the server. As the patient data scrolls across the display screen 602, each of the first portion 616, the second portion 618, and the third portion 620 and the dividing lines 617 and 619 may move correspondingly to accommodate new patient data received at the patient monitor. For example, if new patient data is displayed at a left side of the display screen 602, the portions 616, 618, and 620 and the dividing line 617 at 619 may scroll to the right, or if the new patient data is displayed at a right side of the display screen 602, the portions 616, 618, and 620 and the dividing line 617 at 619 may scroll to the left.

Additionally, the user of the patient monitor may manually scroll the patient data (e.g., including the portions 616, 618, and 620 and the dividing line 617 at 619) to the left or to the right via a left scroll button 608 and a right scroll button 610, respectively. For example, as new patient data is received at the patient monitor, the patient data of a previous time may no longer be visible on the display screen 602, whereby the user may scroll the patient data in a direction opposite to the direction that the patient data continuously scrolls, in order to view patient data of the previous time.

If an alarm is triggered at either the local data processing module or the cloud data processing module, an alarm generator of the patient monitor (e.g., the alarm generator 208) may select a suitable alarm to display, and display the suitable alarm on the display screen 602. In various embodiments, the alarm displayed on the display screen 602 may include a visual element superimposed on the patient data, such as an icon and/or text indicating what generated the alarm. As described above in reference to FIG. 2A, the visual element representing the alarm may have a color (e.g., red), or a distinctive shape, or may be flashing or pulsing to attract and attention of the user. Additionally or alternatively, a portion of the patient data may be highlighted to indicate at what point the alarm was generated and a cause of the alarm. When the user uses the alarm on the display screen 602, the user may turn off the alarm via an alarm off button 612.

Thus, methods and systems are described herein to alternatively process patient data received at a patient monitor from sensors arranged on a patient either at the patient monitor, or at a cloud-based server, where the cloud-based server may be accessed by the patient monitor via a wireless network. A determination of whether to process the patient data at the patient monitor or at the cloud-based server may be made at the patient monitor, based on one or more factors including a connection and/or a strength of the connection between the patient monitor and the wireless network, a state of the patient monitor (e.g. turned off or turned on), a state of a battery of the patient monitor, and/or other factors. As processing of the patient data may be computationally heavy, by sending the patient data to be processed at the cloud-based server, a charge of the battery may be preserved for a longer period of time, whereby a time that the patient monitor may continue to operate without being recharged may be increased or maximized. Additionally, an amount of heat generated at the patient monitor may be reduced or maintained at a low level, increasing the level of comfort of the patient. When a user such as a caregiver turns on the patient monitor, the user may be able to view the patient data received from the sensors, and additionally see where the patient data is being processed and when the patient data was being processed at the cloud-based server and when the patient data was being processed at the patient monitor. Further, the methods and systems described herein may be used to balance the processing of the patient data between different components of a patient monitoring system based on criteria such as relative processing power, the connection to the wireless network, the state of the patient monitor, and/or other criteria, where the different components include the sensors, the patient monitor, and the cloud-based server. By balancing the processing between the different components, an efficiency of the patient monitoring system may be increased.

The technical effect of sending patient data received at a patient monitor to a cloud-based server for processing when certain criteria of the patient monitor are met is that the consumption of power of the patient monitor may be reduced, thereby extending a duration during which the patient monitor may be operated without recharging.

The disclosure also provides support for a wireless patient monitor comprising: a wireless transceiver configured to transmit and receive information, a battery configured to power the patient monitor, a memory storing one or more instructions, one or more processors configured to execute the one or more instructions to: receive physiological patient data generated by one or more sensors arranged on a patient, control the transceiver to transmit the physiological patient data to a cloud-based server over a network for processing the physiological patient data based on an algorithm, receive the processed physiological patient data from the cloud-based server, and in response to one or more criteria being met, terminate transmission of the physiological patient data from the wireless patient monitor to the cloud-based server, and process the physiological patient data at the wireless patient monitor based on the algorithm. In a first example of the system, the one or more criteria is at least one of: a loss of a network connection between the patient monitor and the cloud-based server, and an activation of a display of the patient monitor. In a second example of the system, optionally including the first example, the one or more processors are further configured to display a result of processing the physiological patient data on the display of the patient monitor in response to the one or more criteria being met. In a third example of the system, optionally including one or both of the first and second examples, displaying a result of the processing of the physiological patient data on the display of the patient monitor further comprises indicating to a user of the patient monitor whether the physiological patient data was processed at the patient monitor or at the cloud-based server. In a fourth example of the system, optionally including one or more or each of the first through third examples, the processing the physiological patient data includes comparing values of the physiological patient data with one or more threshold values, and the result of processing the physiological patient data is a health status of the patient. In a fifth example of the system, optionally including one or more or each of the first through fourth examples, the one or more processor is further configured to display the physiological patient data on the display along with the health status. In a sixth example of the system, optionally including one or more or each of the first through fifth examples, the one or more processor is further configured to, in response to one or more values of the physiological patient data exceeding a threshold value, generate an alarm, and control the display of the patient monitor to display the alarm. In a seventh example of the system, optionally including one or more or each of the first through sixth examples: in a first condition, where the one or more values exceed the threshold value, the alarm is generated and displayed on the display of the patient monitor, and in a second condition, where the one or more values do not exceed the threshold value, the alarm is not generated and not displayed on the display of the patient monitor. In an eighth example of the system, optionally including one or more or each of the first through seventh examples, generating the alarm further comprises generating the alarm based on alarm data transmitted to the patient monitor from the cloud-based server. In a ninth example of the system, optionally including one or more or each of the first through eighth examples, generating the alarm based on alarm data further comprises: processing the physiological patient data at the patient monitor, comparing the processed physiological patient data to the alarm data to validate the alarm data, in response to the alarm data being validated, displaying the alarm on the patient monitor, and in response to the alarm data not being validated, not displaying the alarm on the patient monitor. In a tenth example of the system, optionally including one or more or each of the first through ninth examples, the physiological patient data is stored in a sample buffer, and the algorithm of the patient monitor receives the physiological patient data from the sample buffer. In a eleventh example of the system, optionally including one or more or each of the first through tenth examples, the one or more processor is further configured to: during the processing of the physiological patient data at the cloud-based server: periodically receive state data of the processing the physiological patient data sent from the cloud-based server, and store the state data in at least one of a state buffer of the patient monitor and the sample buffer of the patient monitor. In a twelfth example of the system, optionally including one or more or each of the first through eleventh examples, the one or more processor is further configured to: in response to the one or more criteria being met: initialize the algorithm of the patient monitor with the state data stored in the state buffer, process the physiological patient data using the initialized algorithm, compare a state of the processing of the physiological patient data to the state data stored in the state buffer and/or the sample buffer to validate the state data, and in response to the state data not being validated, set a diagnostic flag at the cloud-based server.

The disclosure also provides support for a system, comprising: a patient monitor connected to a wireless local area network (WLAN) of a hospital, the patient monitor including one or more processors having executable instructions stored in a non-transitory memory that, when executed, cause the one or more processors to: in response to receiving physiological patient data from one or more sensors arranged on a body of a patient: in a first condition, where the patient monitor is connected to a wireless network of the hospital and a display of the patient monitor is switched off, transmit the physiological patient data to a cloud-based server for processing, and in a second condition, the second condition including at least one of the patient monitor not being connected to the wireless network and the display being switched on, process the physiological patient data at the patient monitor. In a first example of the system, processing the physiological patient data at the patient monitor further comprises displaying a result of the processing of the physiological patient data on a screen of the patient monitor, the result at least one of: a health status of the patient, an alarm alerting a user of the patient monitor of the health status, processed physiological patient data of the patient, and the physiological patient data. In a second example of the system, optionally including the first example, further executable instructions are stored in the non-transitory memory that, when executed, cause the one or more processors to display an indication of whether physiological patient data displayed on the screen was processed at the cloud-based server or the patient monitor.

The disclosure also provides support for a server comprising: a memory storing one or more instructions, one or more processors configured to execute the one or more instructions to: receive state data from a patient monitor via a wireless network, the state data indicating a state of processing of physiological patient data of a patient that is being performed at the patient monitor, initialize an algorithm based on the state data, receive the physiological patient data from the patient monitor over the wireless network, initiate processing of the physiological patient data using the initialized algorithm, and update a hospital information system with a result of the processing of the physiological patient data. In a first example of the system, the one or more processors are further configured to periodically send state data to the patient monitor over the wireless network, the state data indicating a state of processing of physiological patient data at the cloud-based server. In a second example of the system, optionally including the first example, the one or more processors are further configured to validate the state data received from the patient monitor based on the processing of the physiological patient data by the server. In a third example of the system, optionally including one or both of the first and second examples, an alarm is generated based on the processing of the physiological patient data by the server, and in response to the alarm being generated, the one or more processors are further configured to send alarm data of the alarm to the patient monitor via the wireless network.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements.

Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A system, comprising:
 a patient monitor connectable to a wireless local area network (WLAN) of a hospital, the patient monitor including one or more processors having executable instructions stored in a non-transitory memory that, when executed, cause the one or more processors to:
  in response to receiving physiological patient data from one or more sensors arranged on a body of a patient:
   in a first condition,
    operate the patient monitor and determine that the patient monitor is connected to the WLAN of the hospital while a display of the patient monitor is switched off, and then,
    responsive to determining that the patient monitor is connected to the WLAN of the hospital while the display of the patient monitor is switched off, maintain the display of the patient monitor off and transmit the physiological patient data to a cloud-based server for processing while maintaining the display of the patient monitor off; and
   in a second condition,
    operate the patient monitor and determine during the second condition that the patient monitor is not connected to the WLAN and the display is switched on,
    responsive to determining during the second condition that the patient monitor is not connected to the WLAN and the display is switched on, process the physiological patient data at the patient monitor.

2. The system of claim 1, wherein further executable instructions are stored in the non-transitory memory that, when executed, cause the one or more processors to display an indication of whether physiological patient data displayed on the display of the patient monitor was processed at the cloud-based server or the patient monitor.

3. The system of claim 1, wherein further executable instructions are stored in the non-transitory memory that, when executed, cause the one or more processors to:
 responsive to switching from the first condition to the second condition, transition from processing the physiological patient data at the cloud-based server to processing the physiological patient data at the patient monitor,
 wherein a discontinuity is avoided when switching from the first condition to the second condition by periodically sending a state of the processing of the physiological patient data from the cloud-based server to the patient monitor during the first condition, and
 wherein a frequency for periodically sending the state of the processing of the physiological patient data from the cloud-based server to the patient monitor during the first condition is more frequent than a length in time of a sample buffer of the patient monitor.

4. The system of claim 3, wherein the state of the processing of the physiological patient data includes a data vector comprising recent health status data generated over a duration extending from a previous transmission of state data at a current point in time.

\* \* \* \* \*